US012567586B2

(12) United States Patent
Jafta et al.

(10) Patent No.: US 12,567,586 B2
(45) Date of Patent: Mar. 3, 2026

(54) FACILE SURFACE COATINGS FOR PERFORMANCE IMPROVEMENT OF BATTERY MATERIAL

(71) Applicant: UT-Battelle, LLC, Oak Ridge, TN (US)

(72) Inventors: Charl J. Jafta, Oak Ridge, TN (US); Xiao-Guang Sun, Oak Ridge, TN (US); M. Parans Paranthaman, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 18/432,242

(22) Filed: Feb. 5, 2024

(65) Prior Publication Data

US 2024/0266528 A1 Aug. 8, 2024

Related U.S. Application Data

(60) Provisional application No. 63/443,462, filed on Feb. 6, 2023.

(51) Int. Cl.
H01M 4/525 (2010.01)
C01G 53/44 (2025.01)
(Continued)

(52) U.S. Cl.
CPC ............ H01M 4/525 (2013.01); C01G 53/44 (2013.01); H01M 4/366 (2013.01); H01M 4/62 (2013.01);
(Continued)

(58) Field of Classification Search
CPC .................................................... H01M 4/525
(Continued)

(56) References Cited

U.S. PATENT DOCUMENTS 9,343,745 B1 * 5/2016 Lin ..................... H01M 4/1393
2009/0200509 A1 * 8/2009 Suzuki .................. H01M 4/505
252/182.1
2018/0219219 A1 * 8/2018 Ito ......................... H01M 4/505

FOREIGN PATENT DOCUMENTS

CN 108461715 * 3/2018
WO 2021198183 * 7/2021

OTHER PUBLICATIONS

Zhang et al., "Enhanced Electrochemical Performance of Ni-Rich Layered Cathode Materials by Using LiPF6 as a Cathode Additive," ChemElectroChem, vol. 6, pp. 1536-1541 (2019).
(Continued)

*Primary Examiner* — Tabassom Tadayyon Eslami
(74) *Attorney, Agent, or Firm* — WARNER NORCROSS + JUDD LLP

(57) ABSTRACT

A method of activating an electrode material is provided. The method includes adding an ion-conducting salt to an organic solvent to obtain a salt solution. An electrode material is introduced to the salt solution to obtain a reaction mixture by heat treating. The reaction mixture is heat treated at a temperature in a range of 50 to 70° C. for a period of time to surface coat the electrode material with an inorganic compound to obtain an activated electrode material. The ion-conducting salt may be a metal bis(fluorosulfonyl)imide, the metal being selected from a group consisting of Li, Na, K, Zn, Mg, Al, and Fe. The time period may be at least 4 hours and may be in a range of 8 to 24 hours. The inorganic compound coated on the electrode material may be LiF.

13 Claims, 27 Drawing Sheets

(51) Int. Cl.
  *H01M 4/36* (2006.01)
  *H01M 4/62* (2006.01)

(52) U.S. Cl.
  CPC ...... *C01P 2002/72* (2013.01); *C01P 2004/80* (2013.01); *C01P 2006/40* (2013.01)

(58) Field of Classification Search
  USPC .............................. 429/218.1; 427/212, 215
  See application file for complete search history.

(56) References Cited

OTHER PUBLICATIONS

Uchida et al., "A New Prospect for Stabilization of Graphite Electrode/Electrolyte Interface in Bis(fluorosulfony)imide Anion-based Ionic Liquid Electrolyte," Electrochemistry, 86(2), 29-31 (2018).

* cited by examiner

FACILE SURFACE COATINGS FOR PERFORMANCE IMPROVEMENT OF BATTERY MATERIAL

CROSS-REFERENCE TO RELATED APPLICATIONS

This application claims the benefit of U.S. Provisional Application No. 63/443,462, filed Feb. 6, 2023, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to battery electrode materials, and more particularly to methods of surface coating battery electrode materials.

BACKGROUND OF THE INVENTION

Ni-rich lithium nickel cobalt manganese oxides such as $LiNi_{0.6}Mn_{0.2}CO_{0.2}O_2$ (NMC622) and $LiNi_{0.8}Mn_{0.1}CO_{0.1}O_2$ (NMC811) have been utilized as cathode active materials in lithium-ion batteries (LIBs) due to their high capacity and favorable low cost. For example, NMC811 can reach a high specific capacity of ~200 mAh $g^{-1}$ with an upper cut-off voltage of 4.3 V vs. $Li/Li^+$ and is well-suited as a high voltage cathode material for LIBs. However, poor cycling stability has been observed in NMC-based LIBs due to electrolyte oxidation at the cathode surface and structural changes of the battery materials at high potentials or high temperatures. Particularly, Ni-rich cathode materials having a layered structure may easily change from the layered phase ($R3^-m$) to a spinel-like phase ($Fd3^-m$) and rock-salt phase ($Fm3^-m$) during high voltage cycling and at high temperatures. Also, these cathode materials may undergo surface structure change in which part of the lithium and oxygen ions are lost from the NMC cathode surface due to transition metal ions ($Ni^{+2}$) migrating to the lithium ion sites, thereby resulting in capacity loss and an increase in battery cell impedance. Additionally, the surface of the cathode materials is easily passivated by LiOH and $Li_2CO_3$ due to surface residual $Li_2O$ reacting with ambient moisture and $CO_2$, leading to high polarization, low capacity, and poor cycling performance. To combat these drawbacks, various methods such as the use of electrolyte additives, use of core-shell structures, doping, and surface coating have been implemented to improve the cycling stability of NMC and other related layered cathode active materials.

The intent of surface coating is to either remove residual lithium compounds or to prevent the surface reactive sites from initiating parasitic reactions, which can thus improve coulombic efficiency and cycling stability. One such coating process uses $LiPF_6$ as a cathode additive and is accomplished by ball milling an $NMC/LiPF_6$/N-methyl pyrrolidinone (NMP) suspension. The milling process results in the NMC surface being coated with a mixture of $Li_3PO_4$—LiF, which improves both the cycling stability and also enhances the rate capability of Li/NMC811 cells. The surface coating of $Li_3PO_4$—LiF is dominated by thermodynamically stable LiF, which is evidenced by the stability of the solid electrolyte interphases (SEIs) and the cycling performance. Other methods of stabilization include coating the cathode materials with inorganic compounds such as $Al_2O_3$, $AlF_3$, $LiFePO_4$, $Li_2MnO_3$, $Li_2ZrO_3$ and the like at high temperatures. However, these processes are energy and labor intensive. Therefore, a need exists for simpler, less energy-intensive methods of stabilizing and activating cathode active materials.

SUMMARY OF THE INVENTION

A method of activating an electrode material is provided. The method includes adding an ion-conducting salt to an organic solvent to obtain a salt solution. The method further includes introducing an electrode material to the salt solution to obtain a reaction mixture. The method further includes heat treating the reaction mixture at a temperature in a range of 50 to 70° C. for a period of time, such that the electrode material is surface coated with an inorganic compound to obtain an activated electrode material. The method is simpler, more energy-intensive, and less costly than conventional methods of activating/stabilizing electrode materials by surface coating the materials.

In specific embodiments, the ion-conducting salt is a metal bis(fluorosulfonyl)imide or a metal (fluorosulfonyl)((trifluoromethyl)sulfonyl)imide, the metal being selected from a group consisting of Li, Na, K, Mg, Zn, Al, and Fe.

In specific embodiments, the organic solvent is one of dimethyl carbonate, diethyl carbonate, ethyl methyl carbonate, propylene carbonate, acetonitrile, acetone, and N-methyl pyrrolidinone.

In specific embodiments, the period of time is at least 4 hours.

In particular embodiments, the period of time is at least 8 hours.

In certain embodiments, the period of time is in a range of 8 to 24 hours.

In specific embodiments, the inorganic compound coated on the electrode material is LiF.

In specific embodiments, the electrode material is further defined as a cathode active material.

In specific embodiments, the electrode material is further defined as an anode active material.

In specific embodiments, the electrode material initially introduced to the salt solution is a passivated electrode material.

In specific embodiments, the step of heat treating further includes stirring the reaction mixture.

In specific embodiments, after the step of heat treating, the method further includes separating the reaction mixture to isolate the activated electrode material.

In particular embodiments, the method further includes the step of washing the isolated activated electrode material with a solvent.

In particular embodiments, the method further includes the step of drying the isolated activated electrode material.

An electrode material for a battery, activated by the method, is also provided.

These and other features of the invention will be more fully understood and appreciated by reference to the description of the embodiments and the drawings.

DETAILED DESCRIPTION OF THE CURRENT EMBODIMENTS

Figure 1:
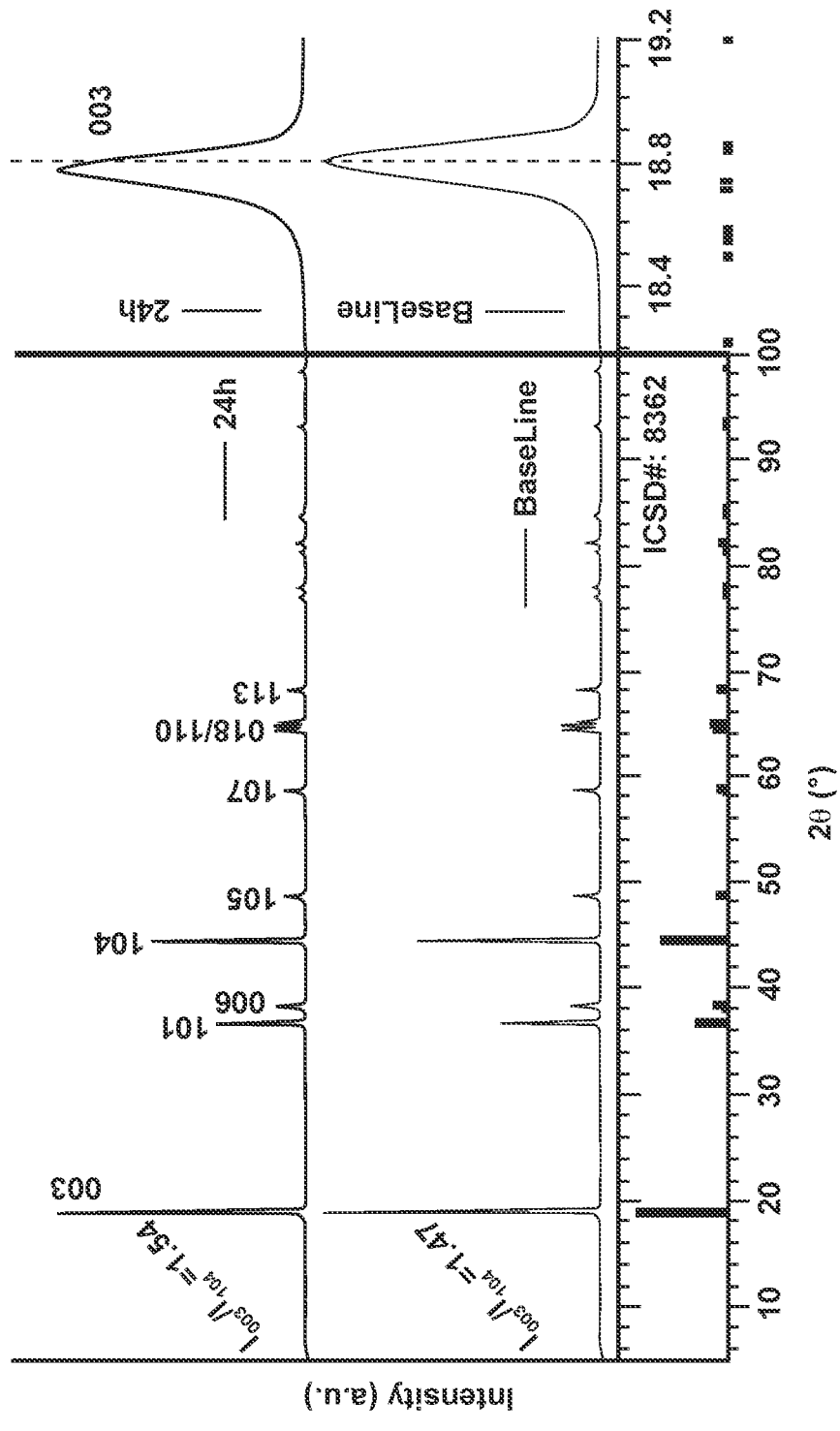
FIG. 1 is a graph of XRD patterns for a pristine NMC811 sample (baseline) and a 24 h treated NMC811 sample in accordance with embodiments of the disclosure.

As discussed herein, the current embodiments relate to a method of activating and/or stabilizing a battery electrode material. The method first includes adding an ion-conducting salt to an organic solvent to obtain a salt solution. The ion-conducting salt is preferably, but not limited to, a metal bis(fluorosulfonyl)imide (MFSI), and the metal (M) may be one of lithium (Li), sodium (Na), potassium (K), magnesium (Mg), aluminum (Al), and iron (Fe). The solvent is not particularly limited and may be any solvent in which the ion-conducting salt is soluble. In some embodiments, the solvent is an organic solvent such as dimethyl carbonate (DMC), acetonitrile, acetone, diethyl carbonate (DEC), diethyl ether, dimethyl ether, and dichloromethane. In one exemplary embodiment, the salt solution is a 3.0 M solution of lithium bis(fluorosulfonyl)imide (LiFSI; chemical formula $F_2LiNO_4S_2$; CAS No. 171611-11-3) in dimethyl carbonate (DMC).

The method next includes introducing an electrode material to the salt solution to obtain a reaction mixture such as a suspension of electrode material in the salt solution. The electrode material is not particularly limited and may be a cathode active material or an anode active material. In some embodiments, the electrode material the composition of the cathode material corresponds to the metal of the ion-conducting salt. For example, the ion-conducting salt may be LiFSI, and the electrode materials may be suitable for lithium-ion (Li-ion) batteries, such as $LiNiO_2$, $LiCoO_2$, $Li(Ni,Mn)_2O_4$, $LiFePO_4$, or lithium nickel manganese cobalt oxides such as NMC622, NMC111, NMC811, and NMC9.0: 0.5:0.5 for cathode materials and graphite, carbon black, or lithium titanate for anode materials. However, other electrode materials are also within the scope of the disclosure. For example, the electrode material may be suitable for sodium-ion (Na-ion) batteries or potassium-ion (K-ion) batteries, and NaFSI can be used for Na-ion battery electrode material while KFSI can be used for K-ion battery electrode material. On the other hand, LiFSI, NaFSI, and KFSI may be used for either Li-ion, Na-ion, or K-ion battery electrode material, i.e. LiFSI does not necessarily have to be used only with Li-ion battery electrode materials, NaFSI does not necessarily have to be used only with Na-ion battery electrode materials, and KFSI does not necessarily have to be used only with K-ion battery electrode materials. Further, the electrode material initially introduced to the salt solution may be a passivated electrode material, i.e., the material is fouled with a substance adsorbed on the material that blocks charge transfer.

The reaction mixture is then heat treated at a certain temperature for a period of time to surface coat the electrode material with an inorganic compound, whereby the electrode material is activated. The temperature may be in a range of 50 to 70° C., such as, for example, 60° C. The period of time is at least 4 hours, optionally at least 5 hours, optionally at least 6 hours, an optionally at least 7 hours, or optionally at least 8 hours. In some embodiments, the period of time is in a range of 8 to 24 hours, such as approximately 8 hours, approximately 16 hours, or approximately 24 hours. The heat treatment also preferably includes stirring or otherwise agitating the reaction mixture during some or all of the time period. In certain embodiments, the inorganic compound that is coated on the electrode material is lithium fluoride (LiF). However, it should be understood that the composition of the inorganic compound is dependent upon the ion-conducting salt selected.

After heat treating the reaction mixture for the period of time, the reaction mixture is separated in order to isolate the activated electrode material. For example, the reaction mixture may be filtered, and the filtrate can be washed with a solvent which may be the same solvent used for the salt solution, such as anhydrous DMC. The filtering and washing may be repeated and thus may be performed multiple times, such as three times. Subsequently, the filtrate can be dried under a vacuum at an elevated temperature such as approximately 110° C. overnight, i.e., approximately in the range of at least 8 to 12 hours.

The activated electrode material obtained by the above method can be used to form an electrode for a battery cell. The activated, surface-coated electrode material reduces the charge transfer resistance of the electrode, leading to not only increased reversible capacity and cycling stability, but also better rate capability. Hence, the method improves the electrochemical performance of the electrode material.

EXAMPLES

The present method is further described in connection with the following laboratory examples, which are intended to be non-limiting.

NMC811 electrodes were prepared by mixing NMC811 powder (obtained from Targray and treated at 120° C. overnight before use) with C45 (carbon black: CB, obtained from MTI Corporation) and polyvinylidene fluoride (PVdF, obtained from MTI Corporation) in N-methyl-pyrrolidone (NMP, obtained from Aldrich) in a 90:5:5 (NMC811:CB: PVdF) ratio to form a well homogenized slurry. The slurry was then cast onto Al foil by a doctor blade method and left under a UV light to allow the solvent (NMP) to evaporate. The electrode was then dried in a vacuum oven overnight at 110° C. The electrode was cut into circular discs with an area of 1.27 cm² and transferred to an Ar-filled glove box. The resulting electrodes had an active material loading of approximately 3-4 mg cm⁻². Li/NMC811 cells were assembled with Celgard 2320 as the separator and 1.2 M LiPF₆ dissolved in a mixture of ethylene carbonate (EC) and ethyl methyl carbonate (EMC) at a weight ratio of 3:7 as the electrolyte inside an Ar-filled glovebox with oxygen and water levels below 0.5 ppm.

Some of the NMC811 electrodes described above were prepared by first surface treating the NMC811 powder. For the treatment procedure of NMC811, a solution of 3.0 mol kg⁻¹ lithium bis(fluorosulfonyl)imide (LiFSI, obtained from Oakwood Chemical and dried at 80° C. under high vacuum for 48 h before use) in dimethyl carbonate (DMC) was prepared in an Ar-filled glove box by adding an appropriate amount of LiFSI in DMC. 2.0 g of NMC811 was suspended in 2.0 g of 3.0 M LiFSI/DMC solution and stirred at 60° C. for 8 hours, 16 hours, and 24 hours, respectively. The suspensions were then filtered and washed with anhydrous DMC for three times, followed by drying at 110° C. overnight under vacuum before casting the electrodes.

The driving force for LiF formation by treatment of NMC811 in the 3.0 M LiFSI/DMC solution at 60° C. is the presence of alkaline species such as $Li_2O$, LiOH and $Li_2CO_3$, of which the latter two species (LiOH and $Li_2CO_3$) are derivatives of the first ($Li_2O$) reacting with moisture and $CO_2$ in air. The weak S—F bonds of LiFSI are easily broken in the presence of the above basic species and heating at 60° C. to form LiF via the following reaction pathways:

| | | |
|---|---|---|
| $Li(NSO_2F)_2 + Li_2O$ | $Li(FSO_2NSO_3Li) + LiF$ | (1) |
| $Li(NSO_2F)_2 + 2LiOH$ | $Li(FSO_2NSO_3Li) + LiF + H_2O$ | (2) |
| $Li(NSO_2F)_2 + Li_2CO_3$ | $Li(FSO_2NSO_3Li) + LiF + CO_2$ | (3) |
| $Li(FSO_2NSO_3Li) + Li_2O$ | $Li(NSO_3Li)_2 + LiF$ | (4) |
| $Li(FSO_2NSO_3Li) + 2LiOH$ | $Li(NSO_3Li)_2 + LiF + H_2O$ | (5) |
| $Li(FSO_2NSO_3Li) + Li_2CO_3$ | $Li(NSO_3Li)_2 + LiF + CO_2$ | (6) |

Li/NMC811 cells were first formed at a current rate of C/10 for two cycles, followed by cycling at C/2 between the voltage range of 3.0 and 4.3 V. Cyclic voltammograms (CVs) were recorded on a Biologic VSP instrument in the voltage range of 3.0-4.5 V at a scan rate of 0.05 mV s⁻¹. Electrochemical impedance spectra (EIS) were tested on the same instrument with an AC signal amplitude of 10 mV in a frequency range from 200 kHz to 10 mHz. For a combined CV-EIS experiment, a sequence of CV, 30 minute rest, EIS was used for six cycles.

XPS data were obtained by using an Al Kα X-ray source operated at 15 kV for an applied power of 300 W. Charge correction was done by shifting all the peaks relative to the C—C peak at a binding energy of 284.8 eV. All the XPS spectra were fitted using CasaXPS. Annular bright field (ABF) scanning transmission electron microscopy (STEM) data were recorded using a Nion UltraSTEM 200 microscope operated at 200 kV. Lattice spacings were measured using image diffractograms. Scanning Electron Microscopy (SEM) images were acquired using a Hitachi S-4800 SEM operated at 5 kV.

FIG. 1 shows the X-ray powder diffraction (XRD) patterns of the pristine and 24 h treated NMC811 samples. No impurities were detected in the treated sample as compared to the pristine sample, indicating that the treatment in LiFSI/DMC does not alter the bulk structure of the materials. However, if looked at in greater detail, two minor changes can be identified. First, the ratio of the two major peaks at 003 and 104 (I003/I104), which is indirectly related to the cation mixing between Li⁺ and Ni²⁺ in the lithium layer, increases from 1.47 for the baseline material to 1.54 for the 24 h treated sample. Second, there is a clear shift of the (003) peak of the 24 h treated sample towards lower angle (zoomed-in spectra at the right side of FIG. 1). This shift implies that the crystal cell along the c direction is enlarged, which can enhance the kinetics of Lit during cycling.

Imaging using SEM and high-resolution ABF STEM was carried out to study the effect of the treatment on the morphologies of the NMC811 materials. The sphere-like morphology from aggregation of the primary particles does not change after treatment for 24 h, and the surface features on the NMC811 particles were observed in the ABF STEM images. In addition, the lattice spacing, which corresponds to (003) planes from the rhombohedral phase, increased from 4.7 Å for the pristine sample to 4.9 Å for the 24 h treated sample, which is consistent with the observed (003) peak shift in the XRD above.

Figure 2A:
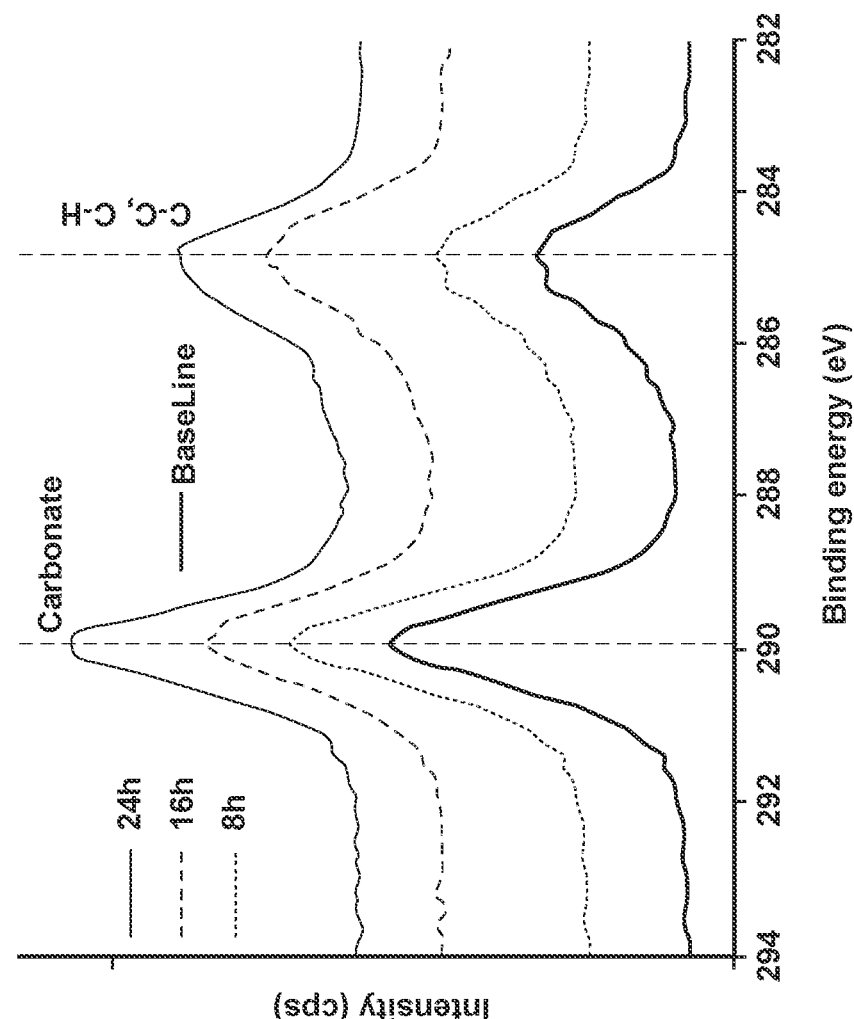
FIG. 2A is a graph of C 1s XPS spectra for a pristine NMC811 sample (baseline) and 8 h, 16 h, and 24 h treated NMC811 samples in accordance with embodiments of the disclosure.
Figure 2B:
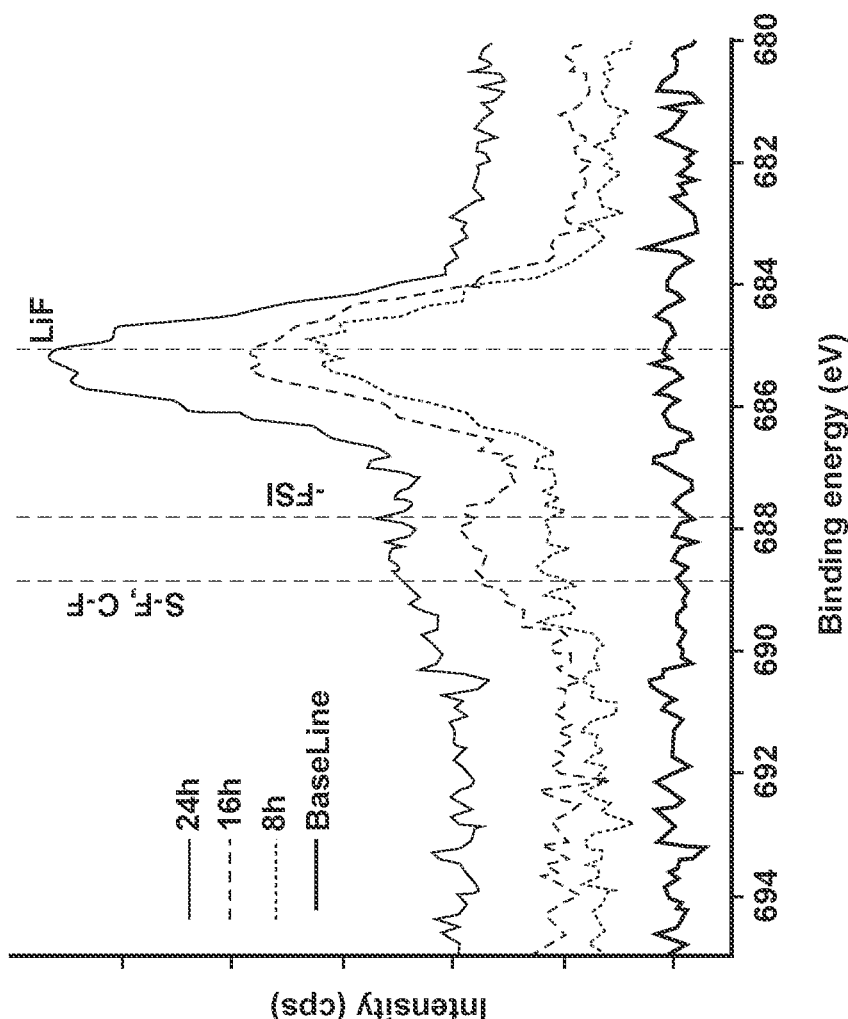
FIG. 2B is a graph of F 1s XPS spectra for the pristine NMC811 sample (baseline) and the 8 h, 16 h, and 24 h treated NMC811 samples.
Figure 2C:
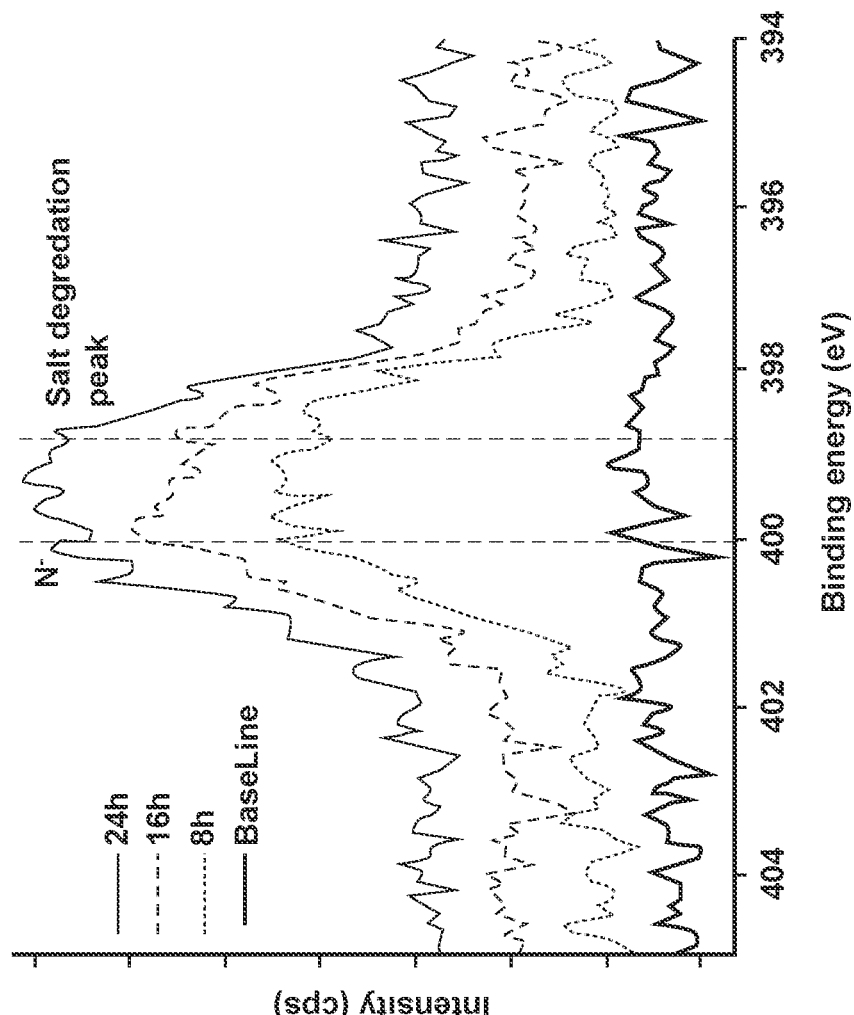
FIG. 2C is a graph of N 1s XPS spectra for the pristine NMC811 sample (baseline) and the 8 h, 16 h, and 24 h treated NMC811 samples.
Figure 2D:
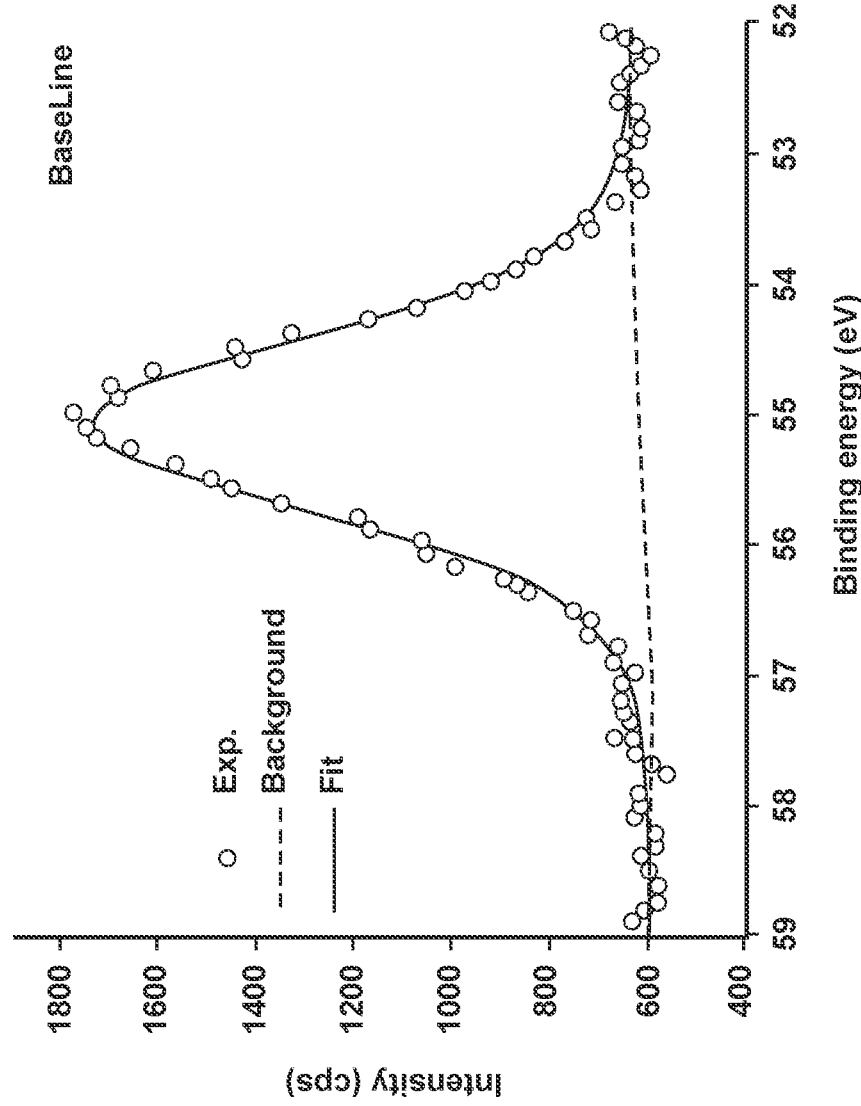
FIG. 2D is a graph of the Li 1s XPS spectrum for the pristine NMC811 sample (baseline)
Figure 2E:
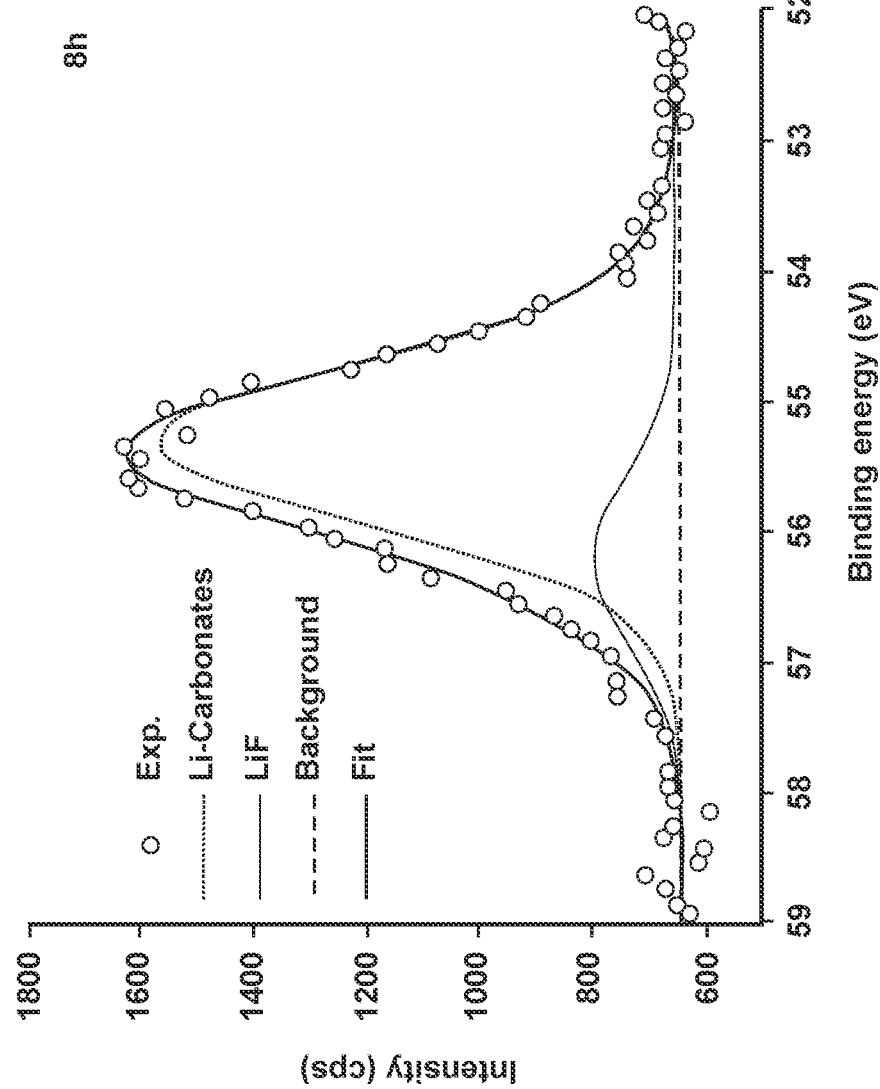
FIG. 2E is a graph of the Li 1s XPS spectrum for the 8 h treated NMC811 sample.
Figure 2F:
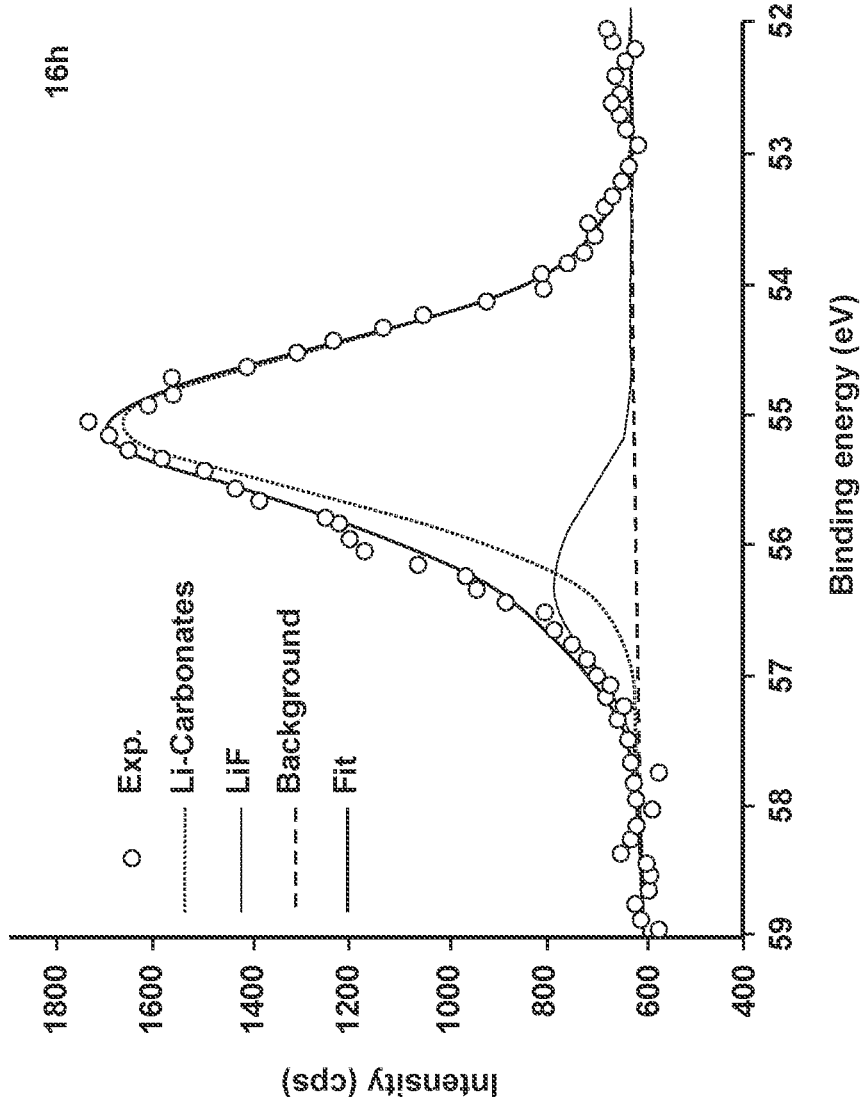
FIG. 2F is a graph of the Li 1s XPS spectrum for the 16 h treated NMC811 sample.
Figure 2G:
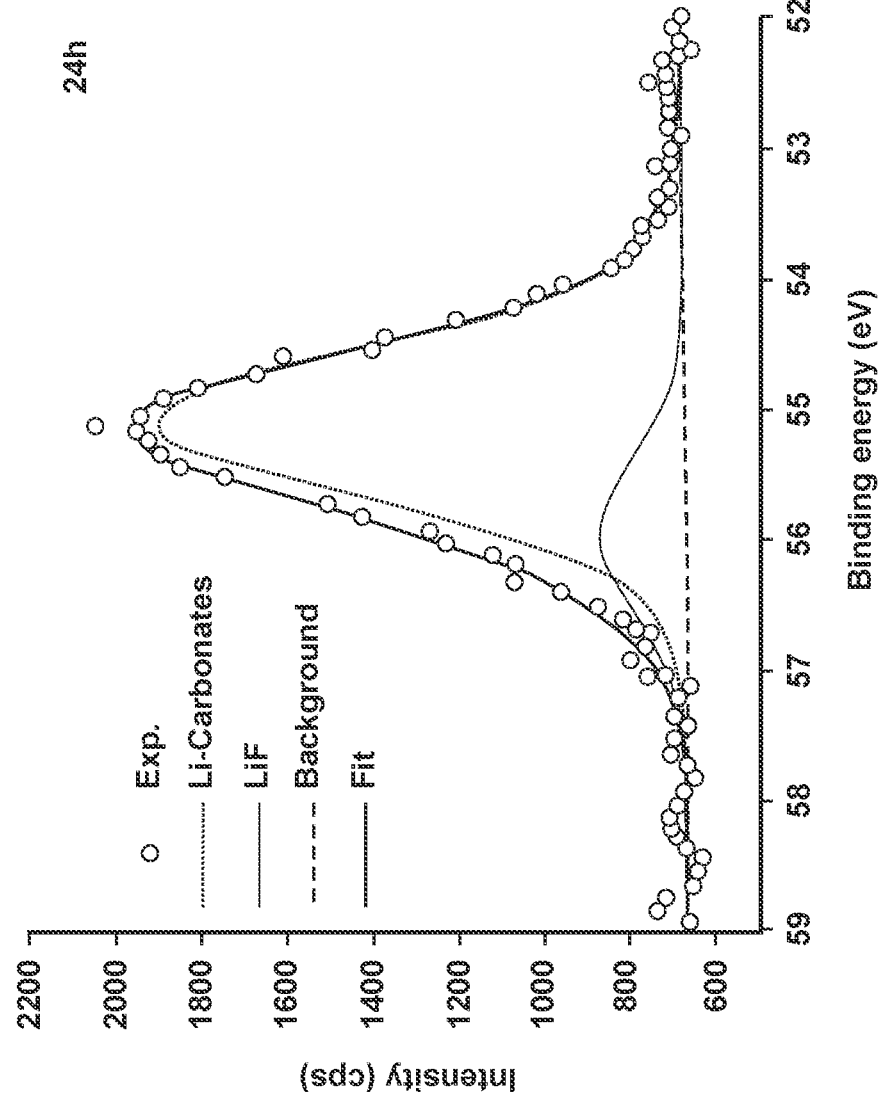
FIG. 2G is a graph of the Li 1s XPS spectrum for the 24 h treated NMC811 sample.

The baseline and treated NMC811 powders were further characterized by X-ray photoelectron spectroscopy (XPS). FIG. 2A shows the C 1s spectra of the baseline and treated NMC811 samples. Besides the adventitious carbon species at 284.8 eV, a dominant carbonate peak at 290 eV was observed in all samples, which can be attributed to the surface $Li_2O$ species reacting with $CO_2$ in the air. Although the proposed reaction pathways (3) and (6) above can reduce the amount of $Li_2CO_3$, it is not expected in a dramatic way to reduce its apparent amount, as the reaction happens in the two-phase solid-solution interphases, not a homogeneous reaction. However, it is noted in FIG. 2B that a large LiF peak at 685 eV was observed for all the treated NMC samples. This result confirms that the above proposed reaction pathways were indeed followed, leading to precipitation of LiF on the surface of the NMC samples. Also, there were some minor FSI segment related species observed at 687.8 and 688.8 eV, respectively. Similarly, in FIG. 2C two N 1s species related to FSI anions were identified at 398.7 and 400 eV, respectively. The aforementioned minor F 1s species are closely related to the N 1s species, which can be attributed to residual LiFSI and its partial decomposition product of $Li(FSO_2NSO_3Li)$ as proposed in pathways (1) through (3), respectively. FIGS. 2D-G show the Li 1s spectra of the pristine and treated NMC811 samples. Clearly, besides the dominant $Li_2CO_3$ peaks, LiF was observed for the three treated samples. In addition, due to the dominance of $Li_2CO_3$, it was hard to identify other LiFSI decomposition species such as $Li(FSO_2NSO_3Li)$ and $Li(NSO_3Li)_2$. On one hand, these XPS results confirm that LiF indeed precipitated on the surface of the NMC cathode powders during the heat treatment in 3.0 M LiFSI/DMC solutions. On the other hand, it appears that the length of treatment time did not result in much difference of LiF coverage on the surface. However, from the point of slow reaction kinetics of two-phase solid-solution reactions, $Li_2CO_3$ should decrease while LiF increases with treatment time at 60° C., as suggested by the following electrochemical impedance spectroscopy (EIS) measurement.

Figure 3A:
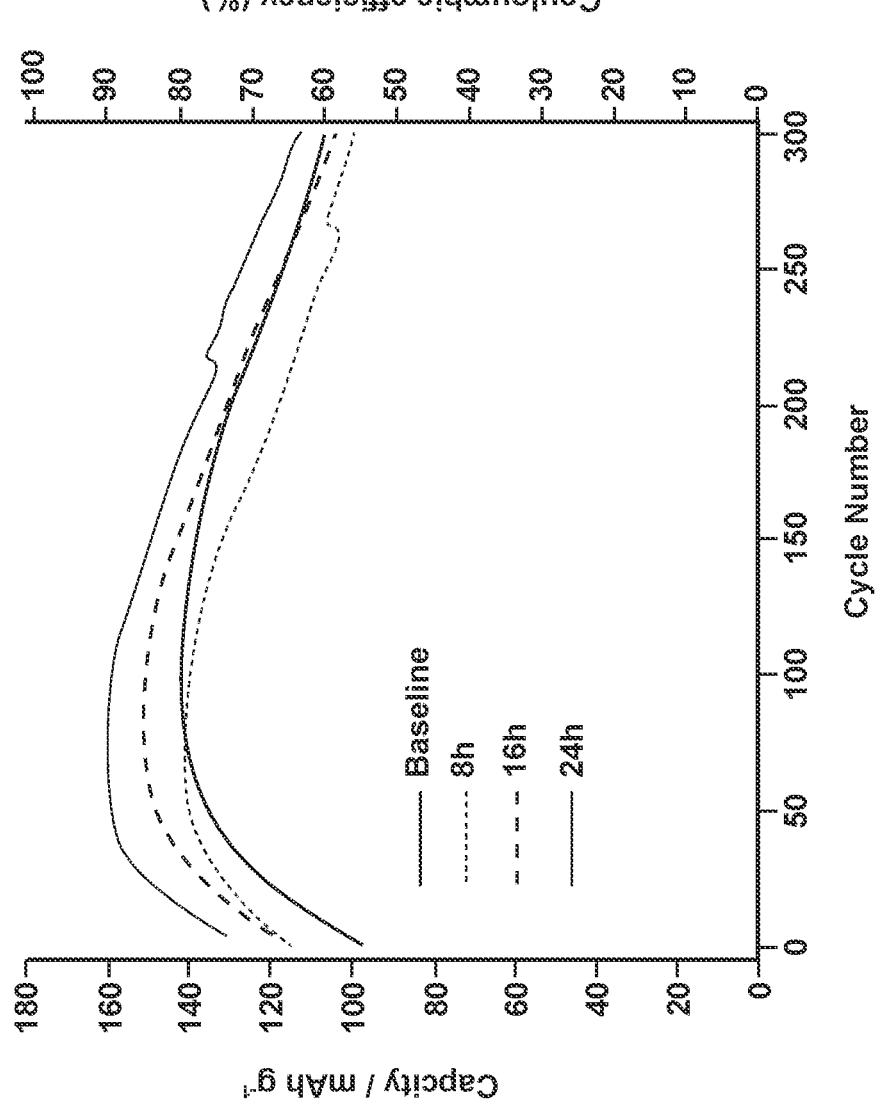
FIG. 3A is a graph of charge/discharge capacities and coulombic efficiencies for the pristine NMC811 sample (baseline) and the 8 h, 16 h, and 24 h treated NMC811 samples.
Figure 3B:
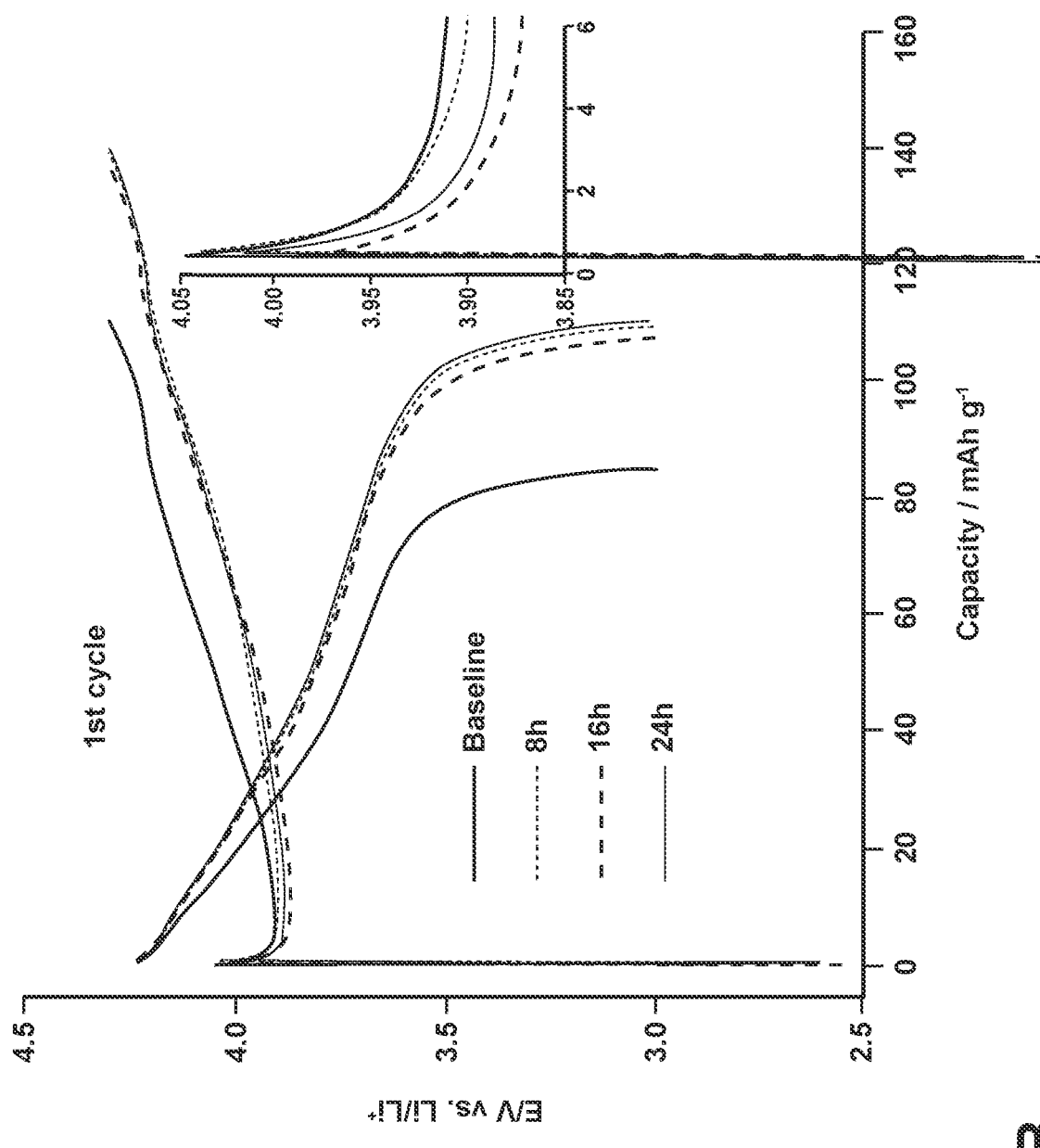
FIG. 3B is a graph of charge/discharge capacities for the pristine NMC811 sample (baseline) and the 8 h, 16 h, and 24 h treated NMC811 samples during a first cycle.
Figure 3C:
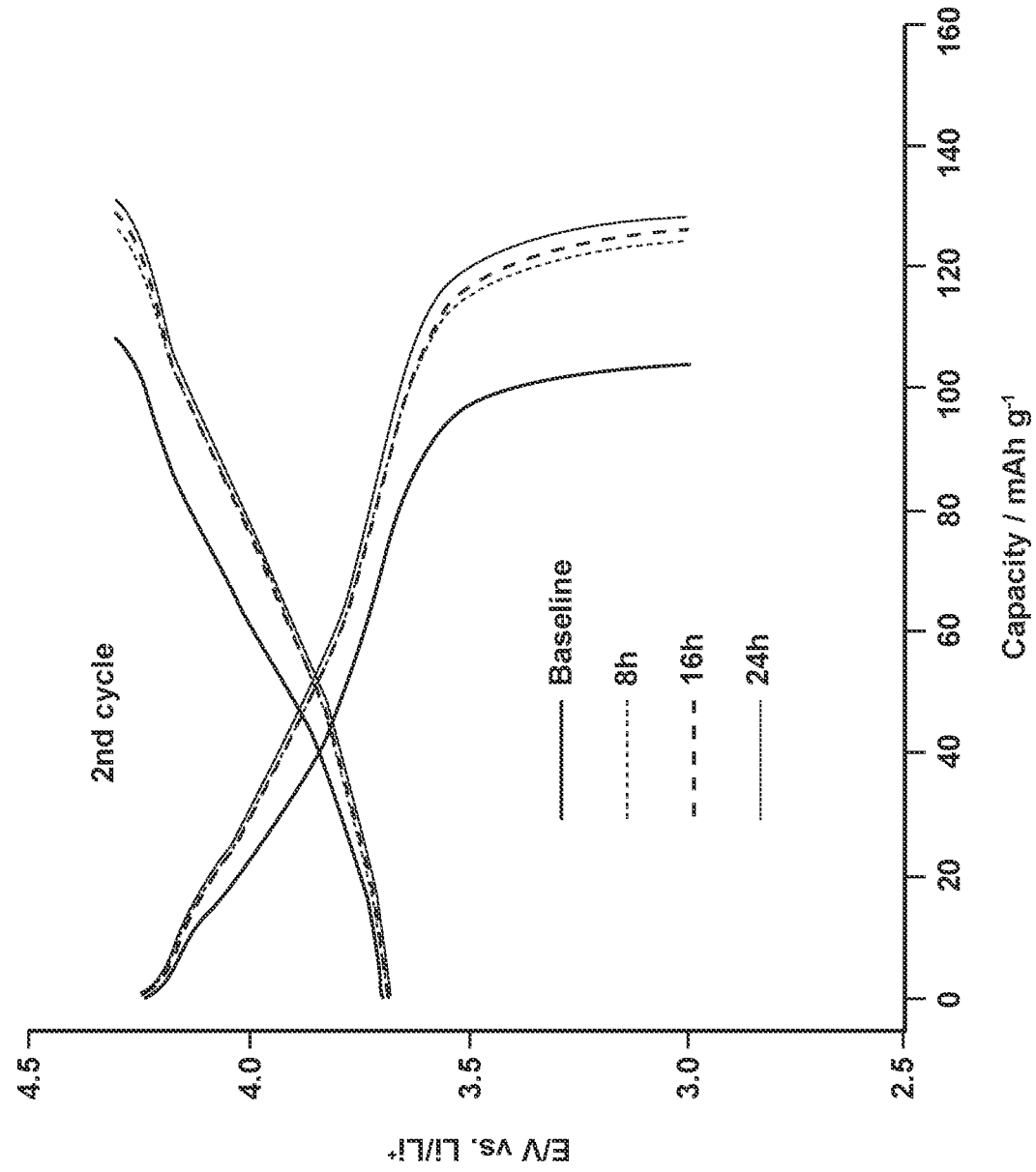
FIG. 3C is a graph of charge/discharge capacities for the pristine NMC811 sample (baseline) and the 8 h, 16 h, and 24 h treated NMC811 samples during a second cycle.

The effect of surface treatment on the NMC cathode materials was characterized by first cycling under a low current rate of C/10 for two cycles, followed by cycling at a constant current rate of C/2 between the voltage range of 3.0 and 4.5 V. Three cells for each sample were assembled and evaluated. FIG. 3A summarizes the averaged results with error bars, and several apparent trends can be observed therefrom. First, both the pristine and treated samples showed initial gradual increase of capacity, followed by gradual decrease. Second, it took more cycles for the pristine sample to reach the maximum capacity than those of the treated samples. Third, the 24 h sample had the highest capacity among all four samples. These features are closely related to the observed strong $Li_2CO_3$ peaks in all the samples, which resulted in high polarizations in all the samples as observed in FIG. 3B during the first charge (i.e., delithiation) process, leading to the initial charge voltage overshoot above 4.0 V (as seen in the inset of FIG. 3B). In addition, the surface $Li_2CO_3$ layer not only resulted in high polarization but also led to low capacities. As shown in FIG. 3B, the initial discharge (lithiation)/charge (delithiation) capacities were 85.0, 109.6, 107.5, 109.7, and 110.2, 139.4, 137.8, 140.0 mAh $g^{-1}$ for the pristine, 8 h, 16 h, and 24 h NMC samples, respectively, resulting in initial coulombic efficiencies of 77.1%, 78.6%, 78.0%, and 78.4%. For the second cycle (FIG. 3C), the corresponding discharge/charge capacities increased to 104.9, 124.7, 126.2, 129.0, and 108.3, 126.8, 128.8, 131.3 mAh $g^{-1}$, respectively, leading to increased coulombic efficiencies of 96.9%, 98.3%, 98.0%, and 98.2%. These capacities are much lower than the theoretical capacity of NMC811 (200 mAh $g^{-1}$) even under a low current rate of C/10, which may be ascribed to both a thick $Li_2CO_3$ layer and high 1003/1104 ratios (FIG. 1). The reversible capacities decreased to much lower values when the current increased to C/2, which at first gradually increased and then decreased with cycling, as shown in FIG.

Figure 3D:
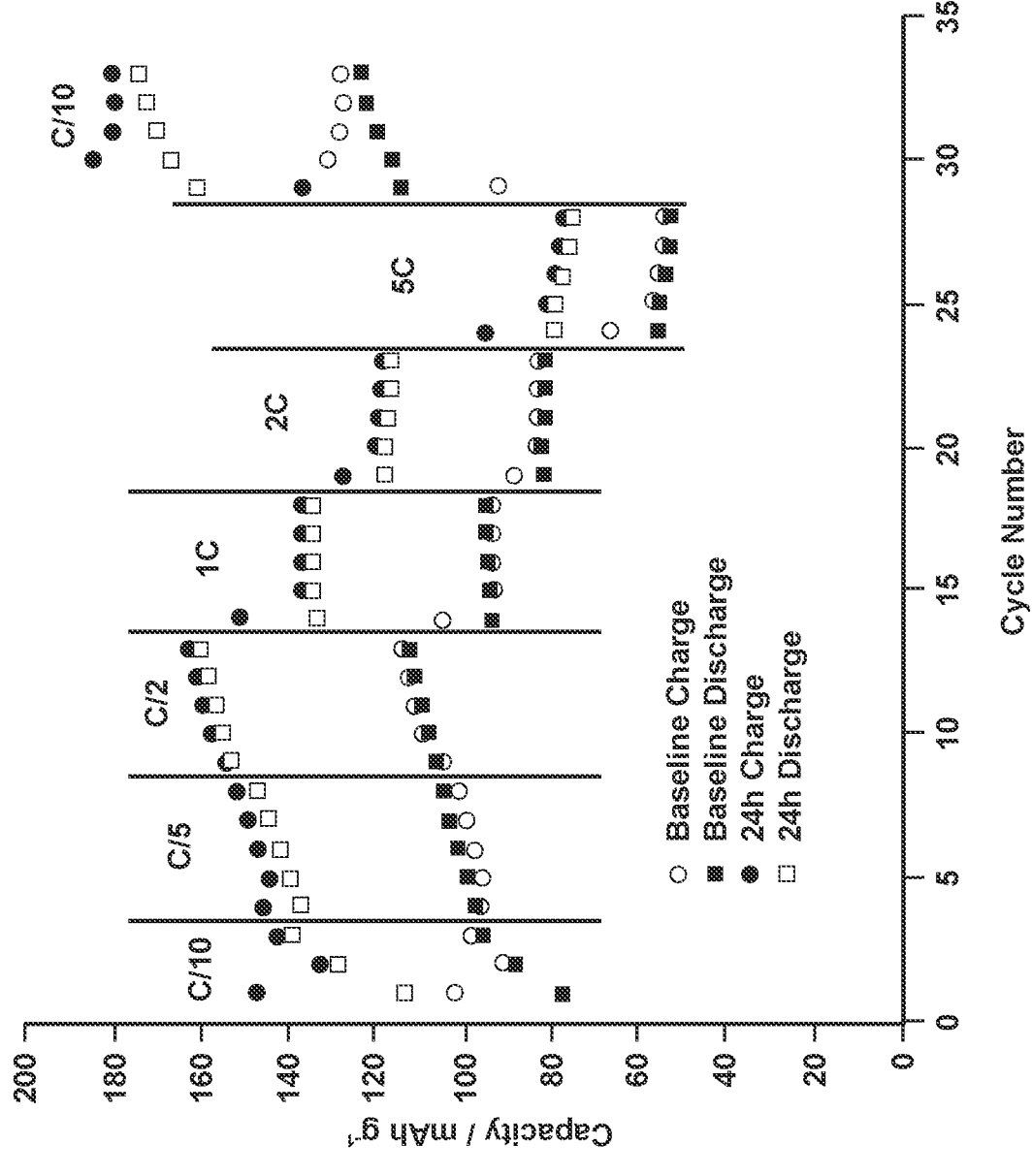
FIG. 3D is a graph of charge/discharge capacities at different current rates over the first 35 cycles for the pristine NMC811 sample (baseline) and the 24 h treated NMC811 sample.
Figure 4A:
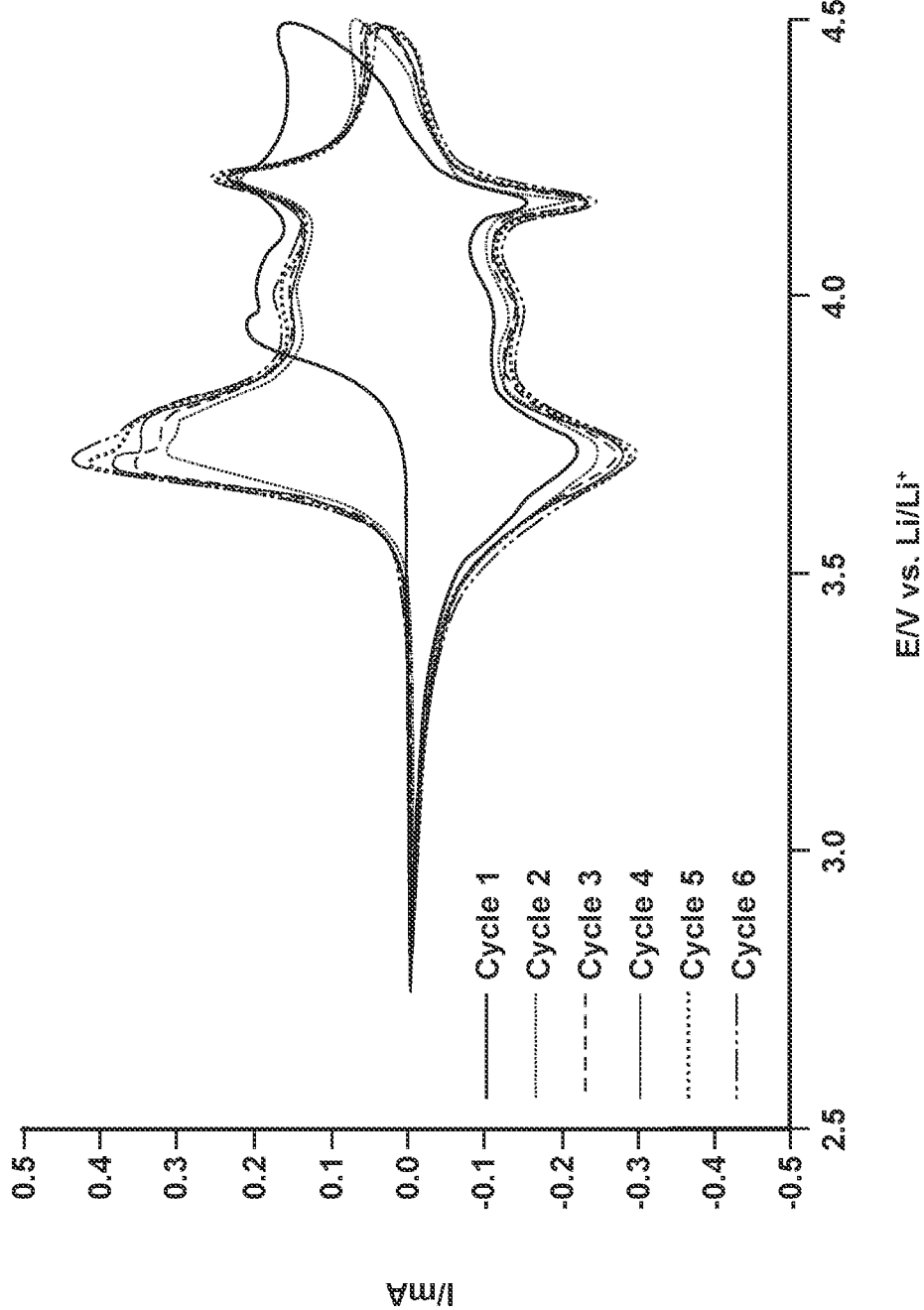
FIG. 4A is a graph of a cyclic voltammogram (CV) at a scan rate of 0.05 mV/s in a voltage range of 3.0 to 4.5 V for the pristine NMC811 sample (baseline)
Figure 4B:
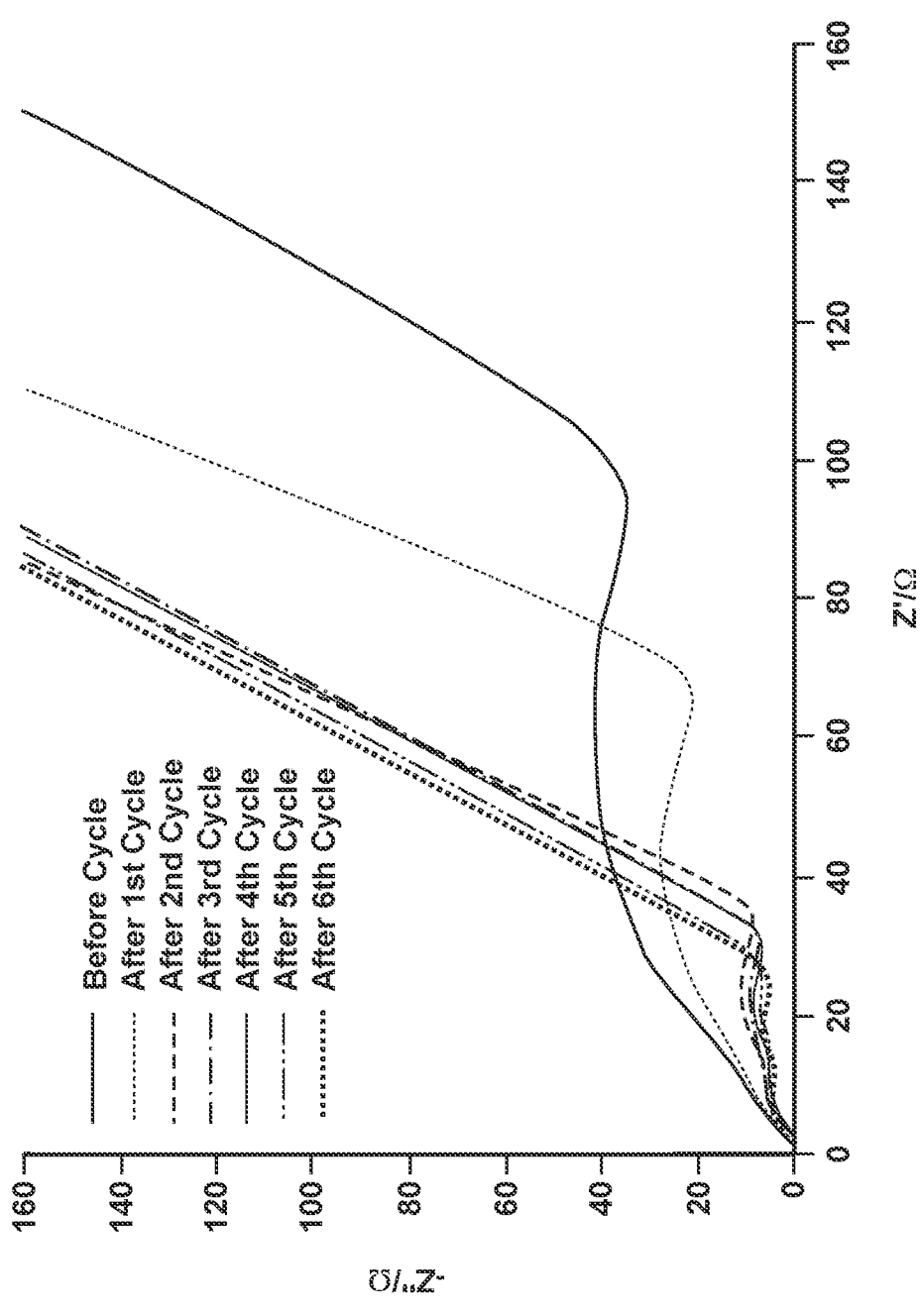
FIG. 4B is a graph of an electrochemical impedance spectroscopy (EIS) for the pristine NMC811 sample (baseline)
Figure 4C:
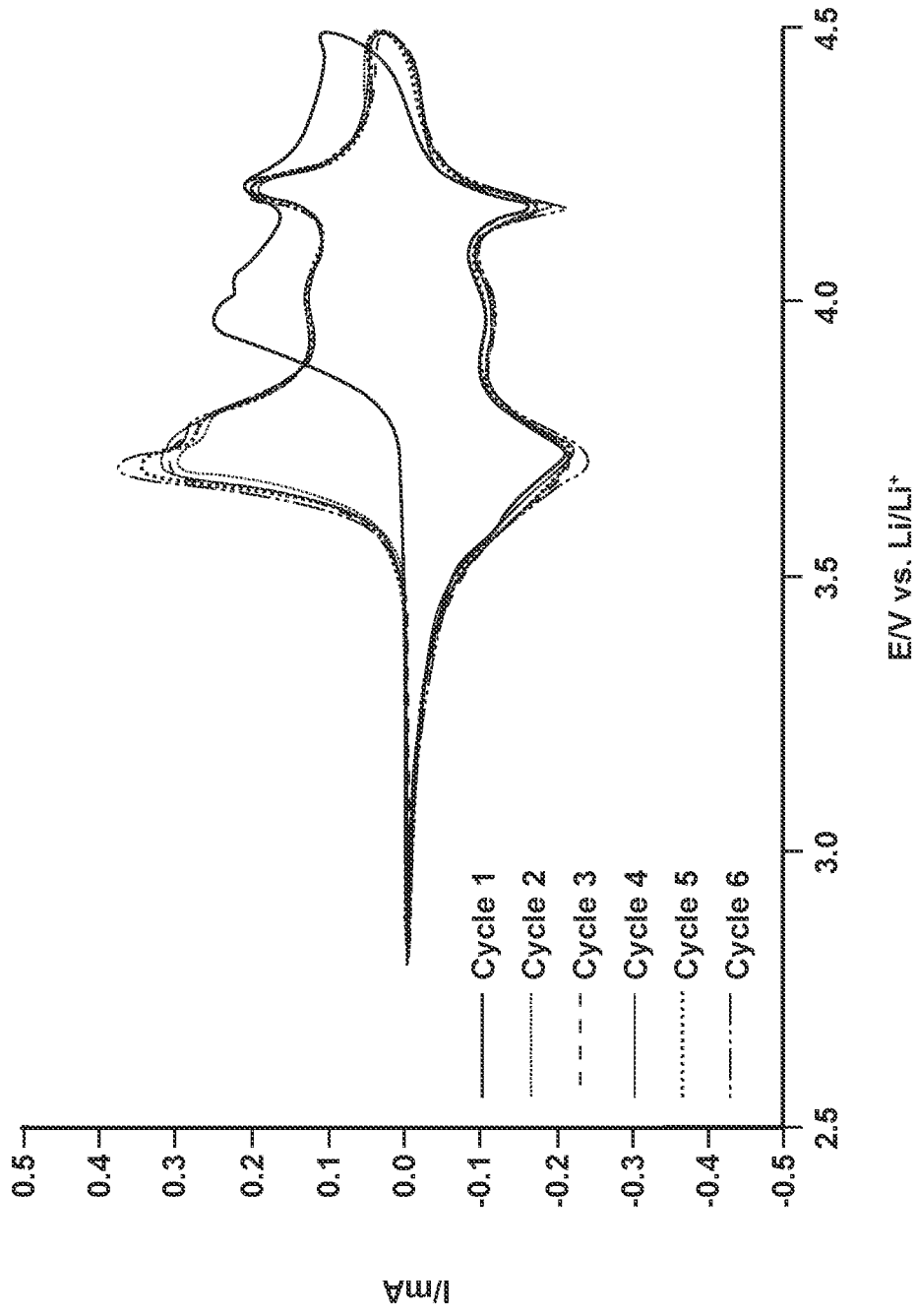
FIG. 4C is a graph of a CV at a scan rate of 0.05 mV/s in a voltage range of 3.0 to 4.5 V for the 8 h treated NMC811 sample.
Figure 4D:
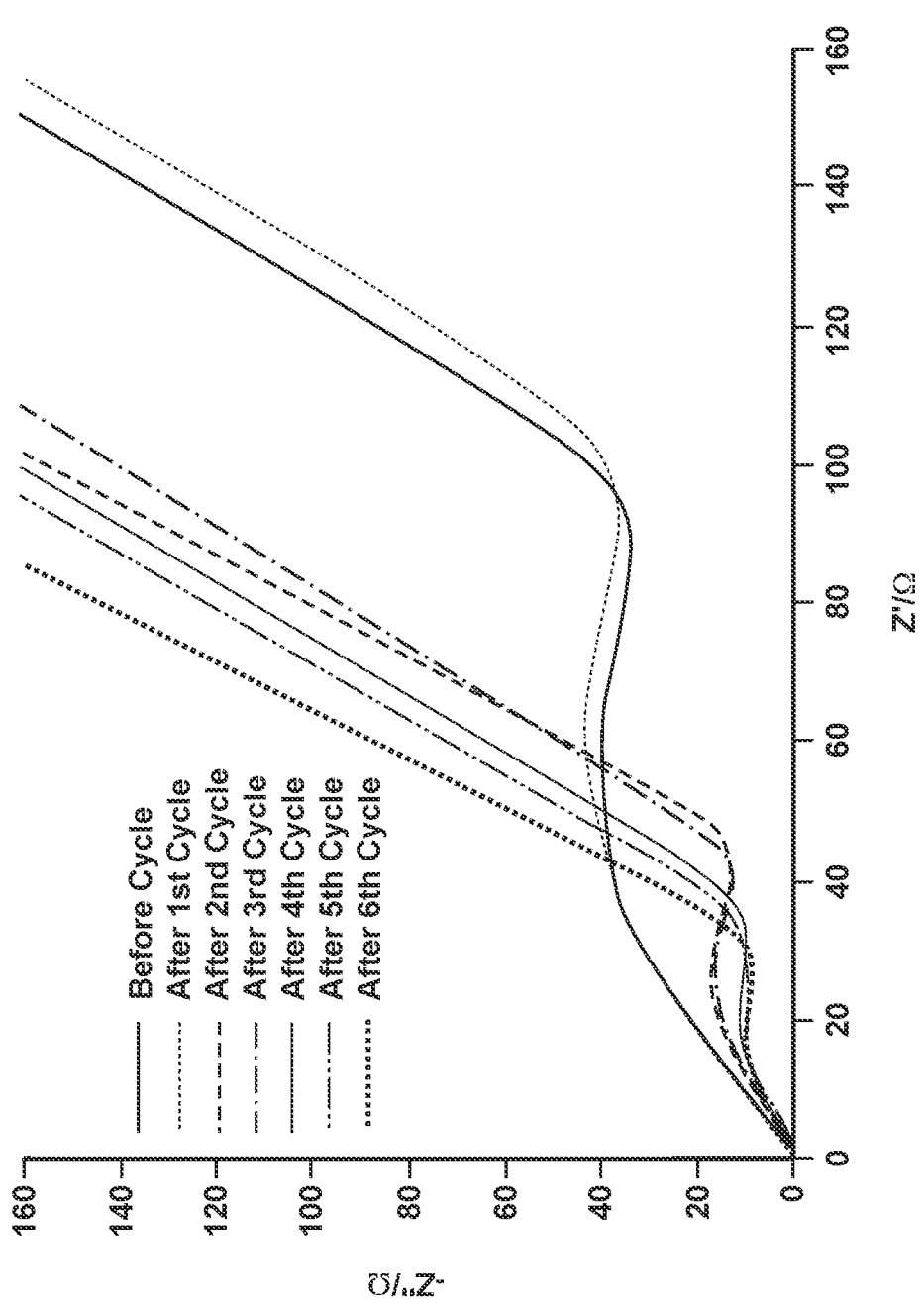
FIG. 4D is a graph of an EIS for the 8 h treated NMC811 sample.
Figure 4E:
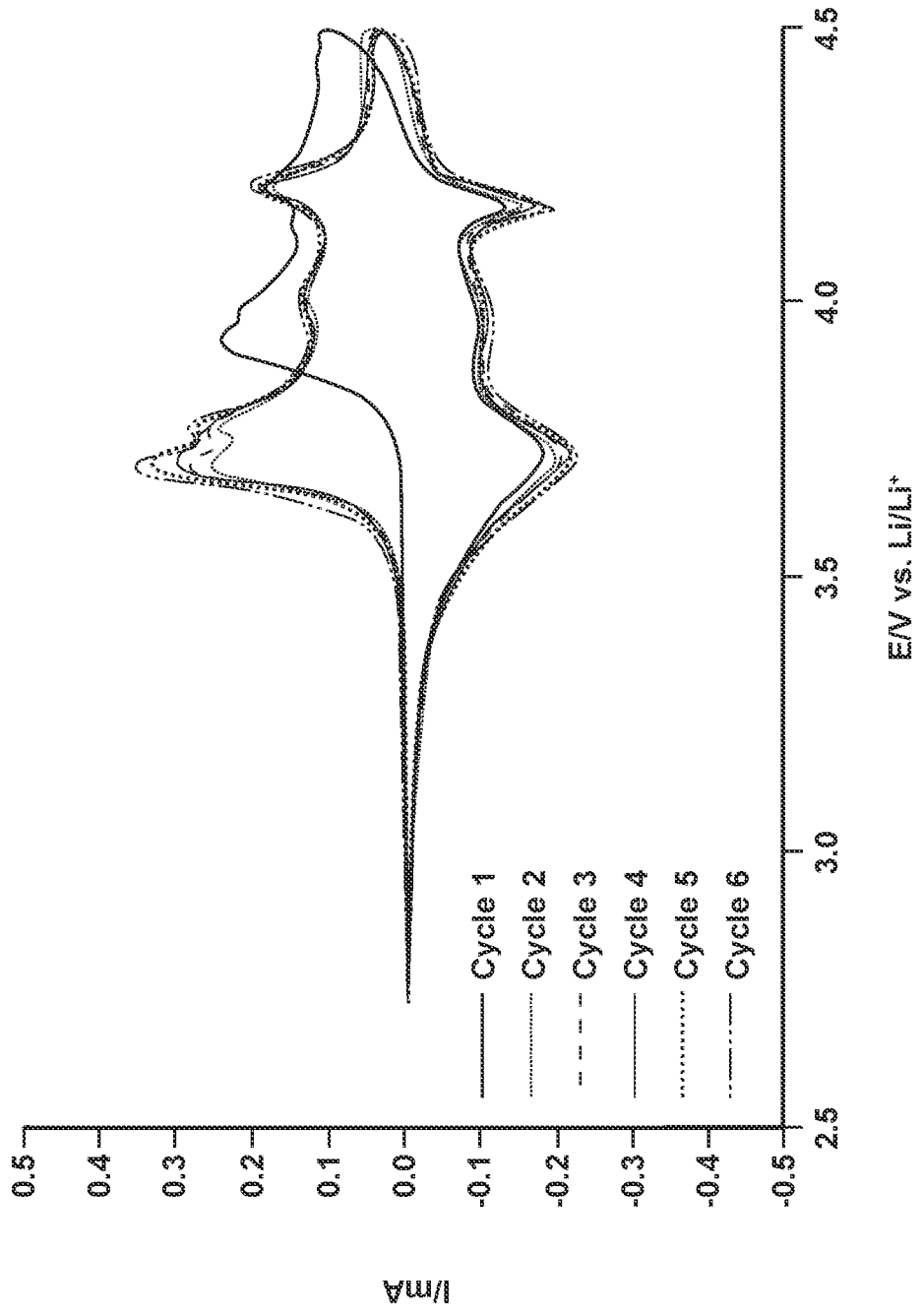
FIG. 4E is a graph of a CV at a scan rate of 0.05 mV/s in a voltage range of 3.0 to 4.5 V for the 16 h treated NMC811 sample.
Figure 4F:
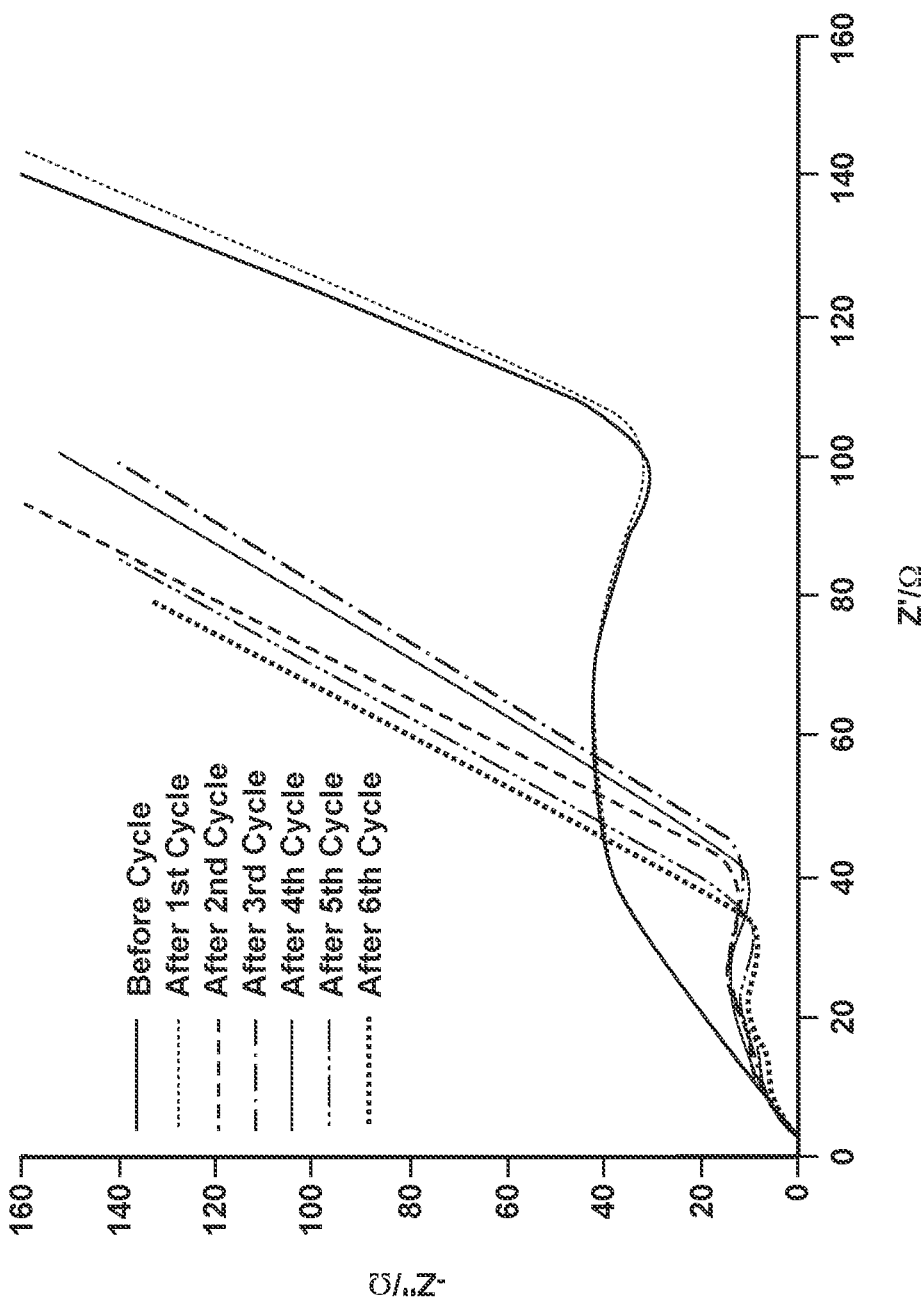
FIG. 4F is a graph of an EIS for the 16 h treated NMC811 sample.
Figure 4G:
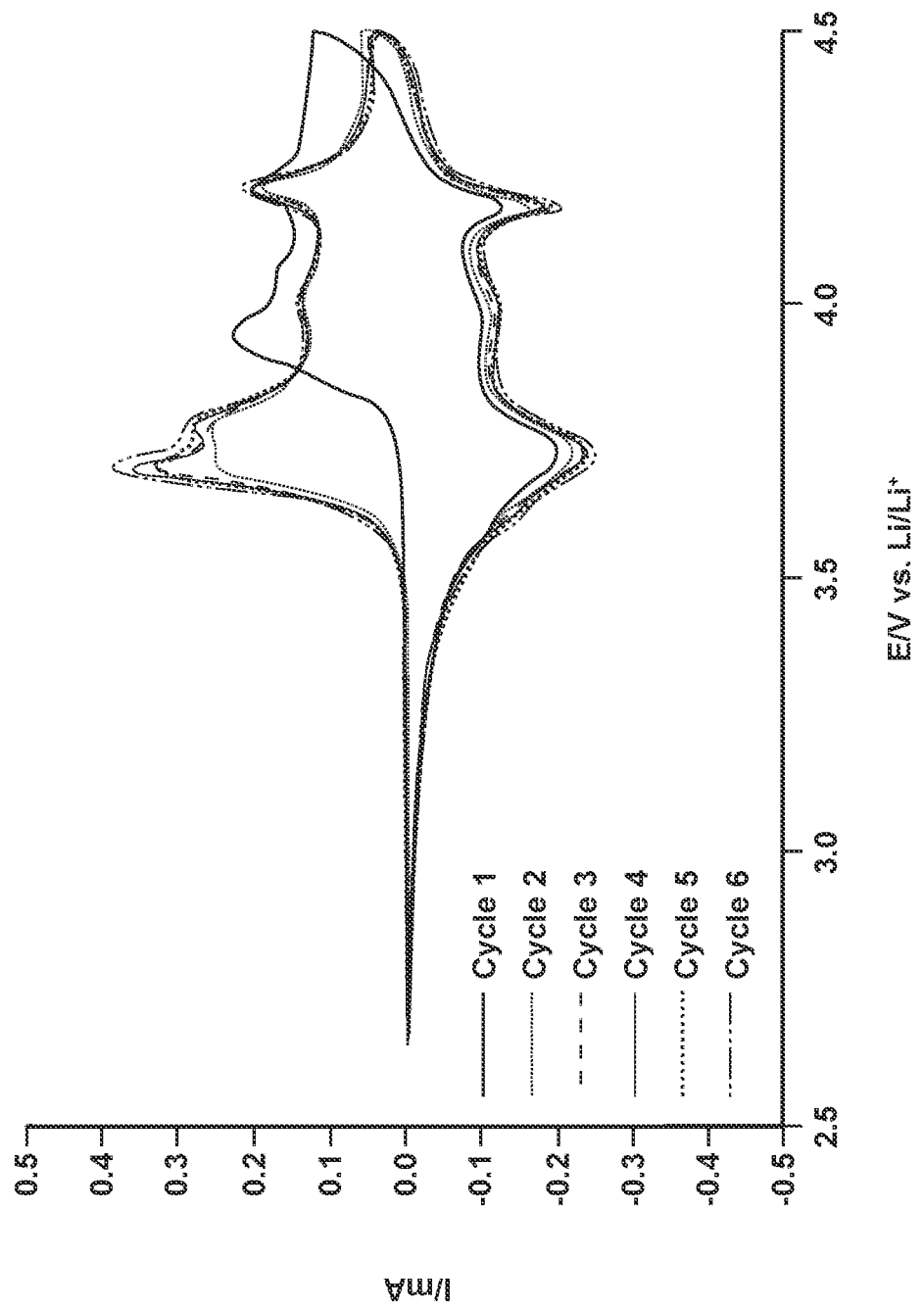
FIG. 4G is a graph of a CV at a scan rate of 0.05 mV/s in a voltage range of 3.0 to 4.5 V for the 24 h treated NMC811 sample.
Figure 4H:
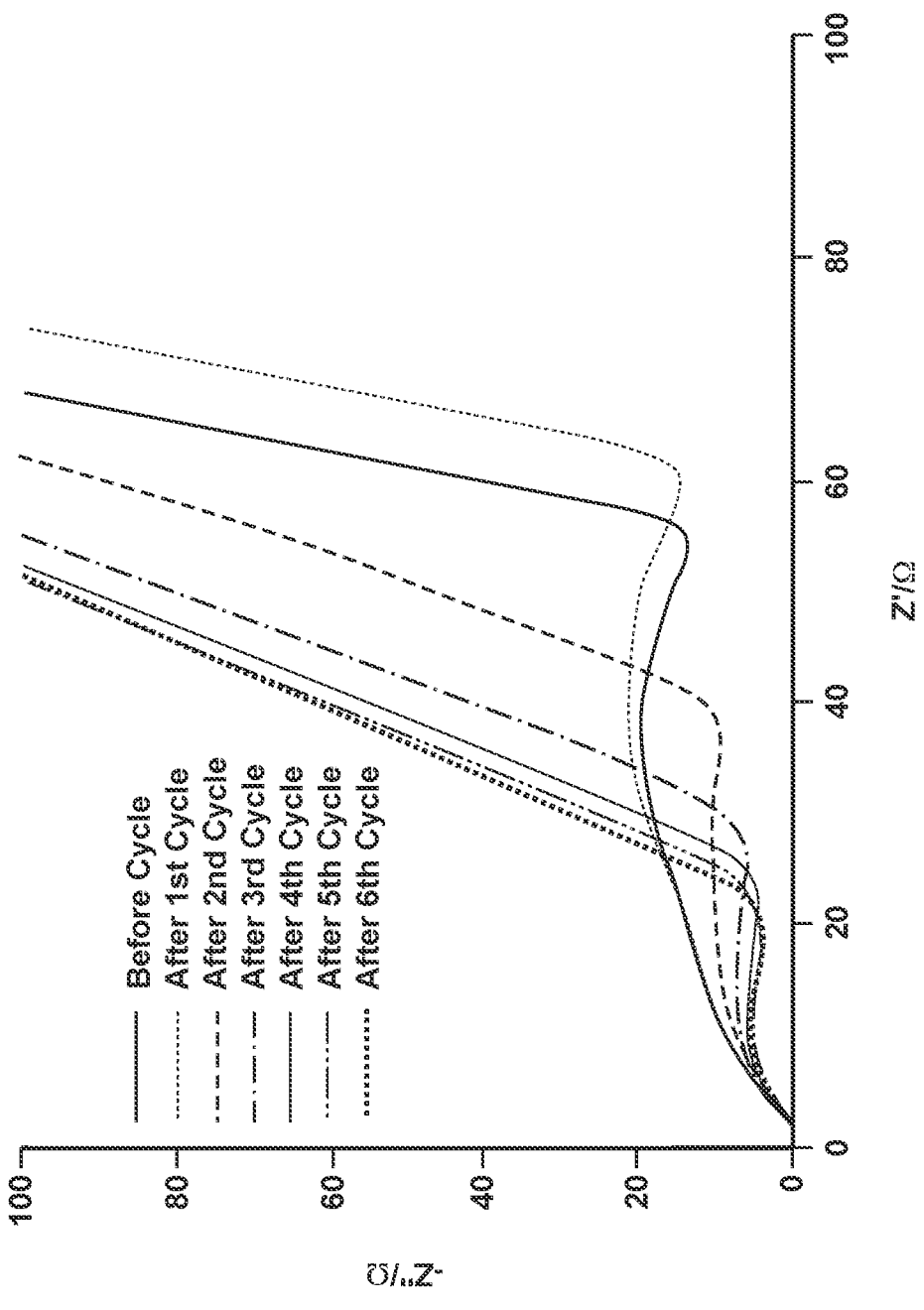
FIG. 4H is a graph of an EIS for the 24 h treated NMC811 sample.

3A. Interestingly, when the current rate were increased gradually from C/10 to C/5 and C/2, the reversible capacities increased rather than decreased (FIG. 3D). The reversible capacities only decreased when the current rate was higher than 1 C (up to 5 C), as normally would be observed due to the limitations of ion diffusion in both the liquid electrolyte and cathode materials. However, once the current rate was reduced to C/10, much higher reversible capacities were obtained, which is consistent with the initial gradual capacity increase in FIG. 3A. It is generally recognized that the increase of capacity with cycling is due to the activation of the cathode materials, which is related to the removal of surface $Li_2CO_3$ species via the following pathways because of the presence of trace moisture in the liquid electrolyte:

| | | | |
|---|---|---|---|
| $LiPF_6$ | $\leftrightarrows$ | $LiF + PF_5$ | (7) |
| $PF_5 + H_2O$ | | $PO_3F + 2HF$ | (8) |
| $LiPF_6 + H_2O$ | | $POF_3 + 2HF + LiF$ | (9) |
| $2Li_2CO_3 + 2HF$ | | $2LiF + H_2O + 2CO_2$ | (10) |

To better understand the initial increase in capacity with cycling, cyclic voltammograms (CV) and electrochemical impedance spectra (EIS) measurements were carried out for six cycles. A 30 minute rest period was set between the measurements of CV and EIS, and the results are shown in FIGS. 4A-H. Overall, four distinct oxidation peaks at 3.71 V, 3.78 V, 4.01 V, and 4.22 V are observed during the delithiation process, which correspond to the multiphase transitions of hexagonal to monoclinic (H1/M), monoclinic to hexagonal (M/H2), and hexagonal to hexagonal (H2/H3). The corresponding reduction were observed at 3.72 V, 3.99 V, and 4.17 V, with the first peak representing two peaks being merged as one. Comparing the CV of the pristine NMC sample (control) with those of the treated ones (8 h, 12 h, 24 h examples), an apparent peak separation appeared between H1+M and M as marked in FIG. 4E with increasing treatment time, particularly during the second cycle. More significant was the comparison of the EIS of the pristine sample and those of the treated ones, which all exhibited strongly superimposed semi-cycle at the high and medium frequencies and sloping at low frequency ranges. The intercept at the high frequency is the bulk resistance ($R_b$) mainly related to the ionic conductivity of the electrolyte, the semicircle at the high frequency is related to the resistance of the surface layer ($R_{SEI}$) and the semicircle at the medium frequency is the Faradic charge-transfer resistance ($R_{ct}$), whereas the slope at the low frequency is the Warburg impedance arising from the semi-infinite diffusion of lithium ion in the solid electrodes. To obtain the values of $R_{SEI}$ and $R_{ct}$, an equivalent circuit shown in FIG. 5G was used to fit the EIS data in FIGS. 4B, 4D, 4F, 4H. $C_{SEI}$ and $C_{dl}$ are capacitances of the SEI film and double-layer, respectively, and the obtained data of $R_b$, $R_{SEI}$ and $R_{ct}$ are plotted in FIGS. 5A-D. The overall EIS ($R_{SEI}+R_{ct}$) decreased with cycling, which is consistent with the initial increase of capacity with cycling as shown in FIG. 3A. However, significant differences existed between the pristine sample and the treated samples, particularly the 24 h treated sample, which can only be ascribed to the treatment of the cathode samples based on the consideration that all the cells were assembled using the same lithium ribbon with both sides being scratched. The first difference was a much smaller $R_{ct}$ (32Ω) for the 24 h treated sample as FIGS. 3A and 3D. $R_{ct}$ for the 24 h treated sample further decreased to lower than 5Ω after two cycles, while those of the other three samples decrease to around 20Ω. Another big difference observed in FIGS.

Figure 5A:
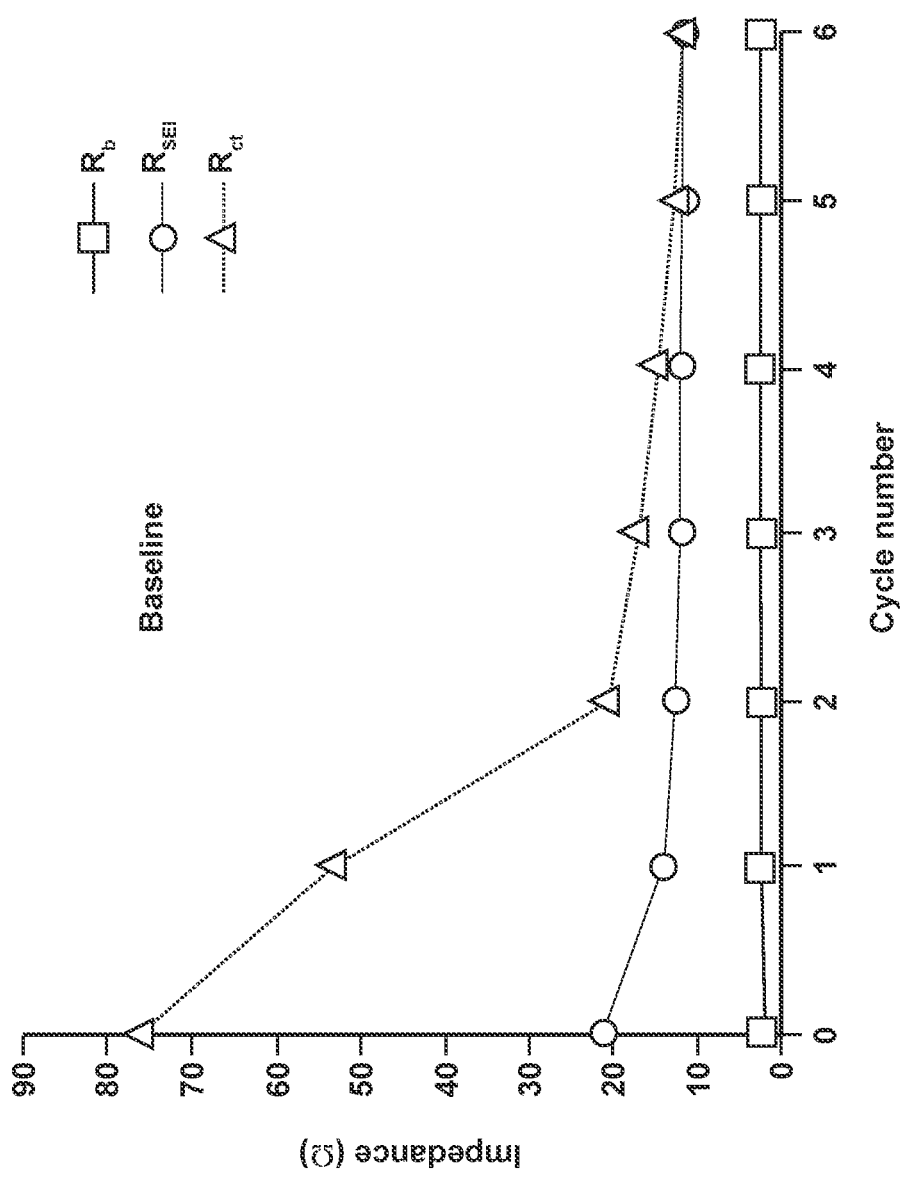
FIG. 5A is a graph of fitted EIS data of $R_b$, $R_{SEI}$, and $R_{ct}$ for the pristine NMC811 sample (baseline)
Figure 5B:
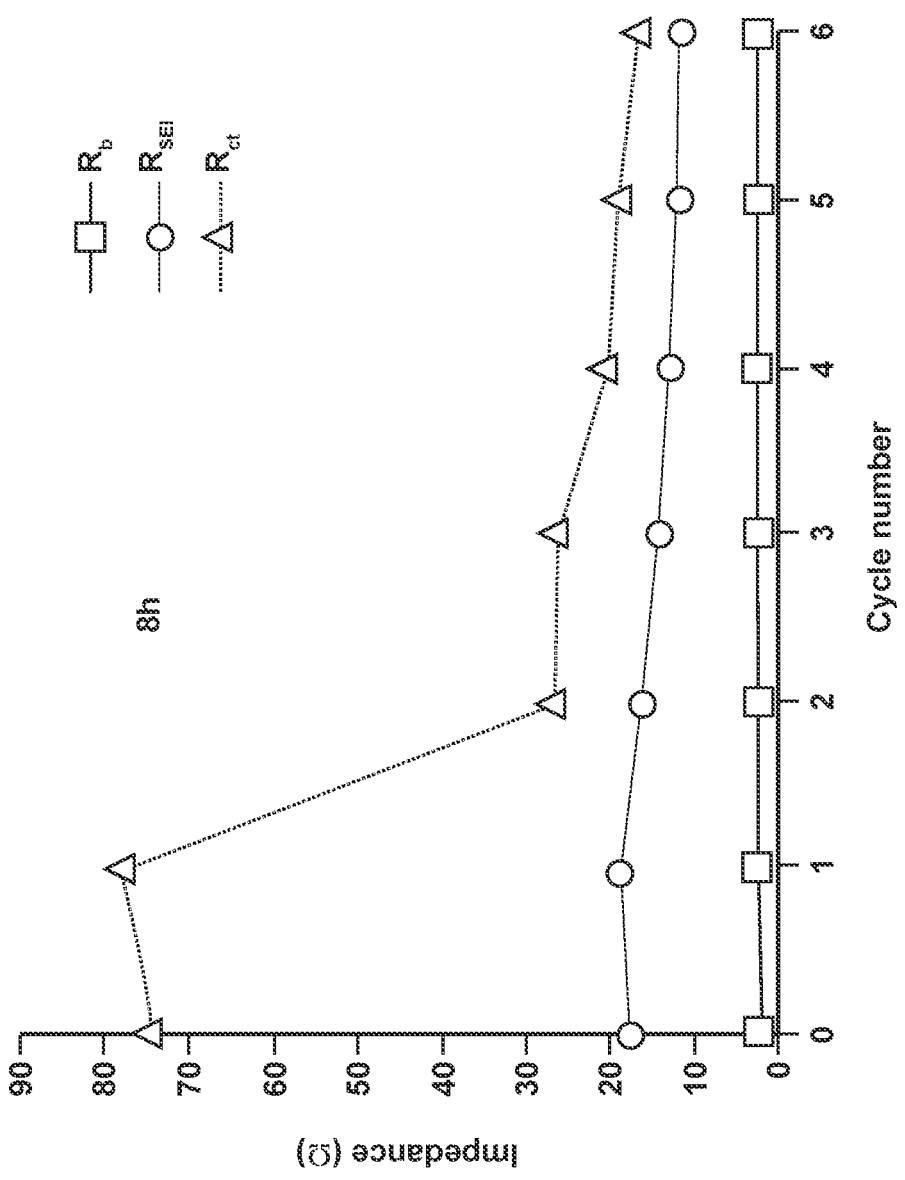
FIG. 5B is a graph of fitted EIS data of $R_b$, $R_{SEI}$, and $R_{ct}$ for the 8 h treated NMC811 sample.
Figure 5C:
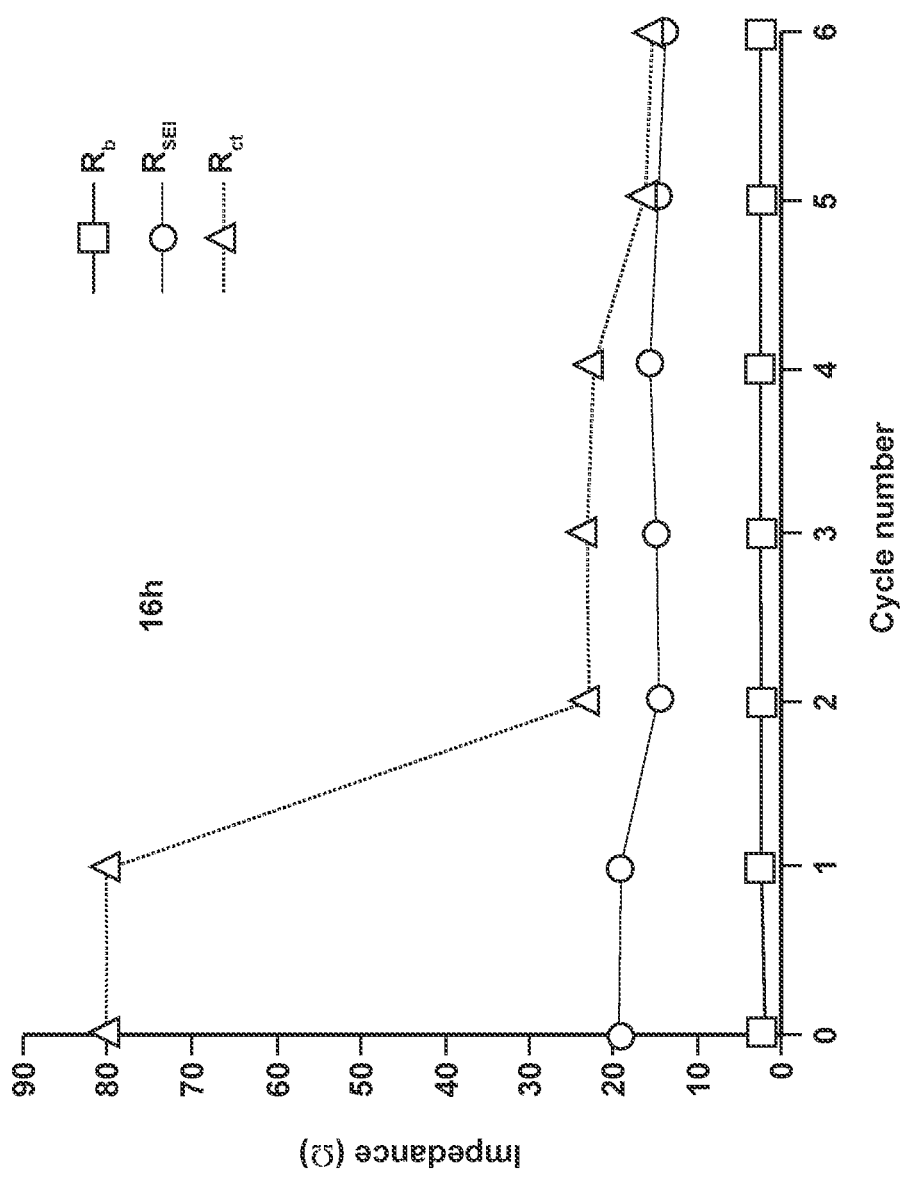
FIG. 5C is a graph of fitted EIS data of $R_b$, $R_{SEI}$, and $R_{ct}$ for the 16 h treated NMC811 sample.
Figure 5D:
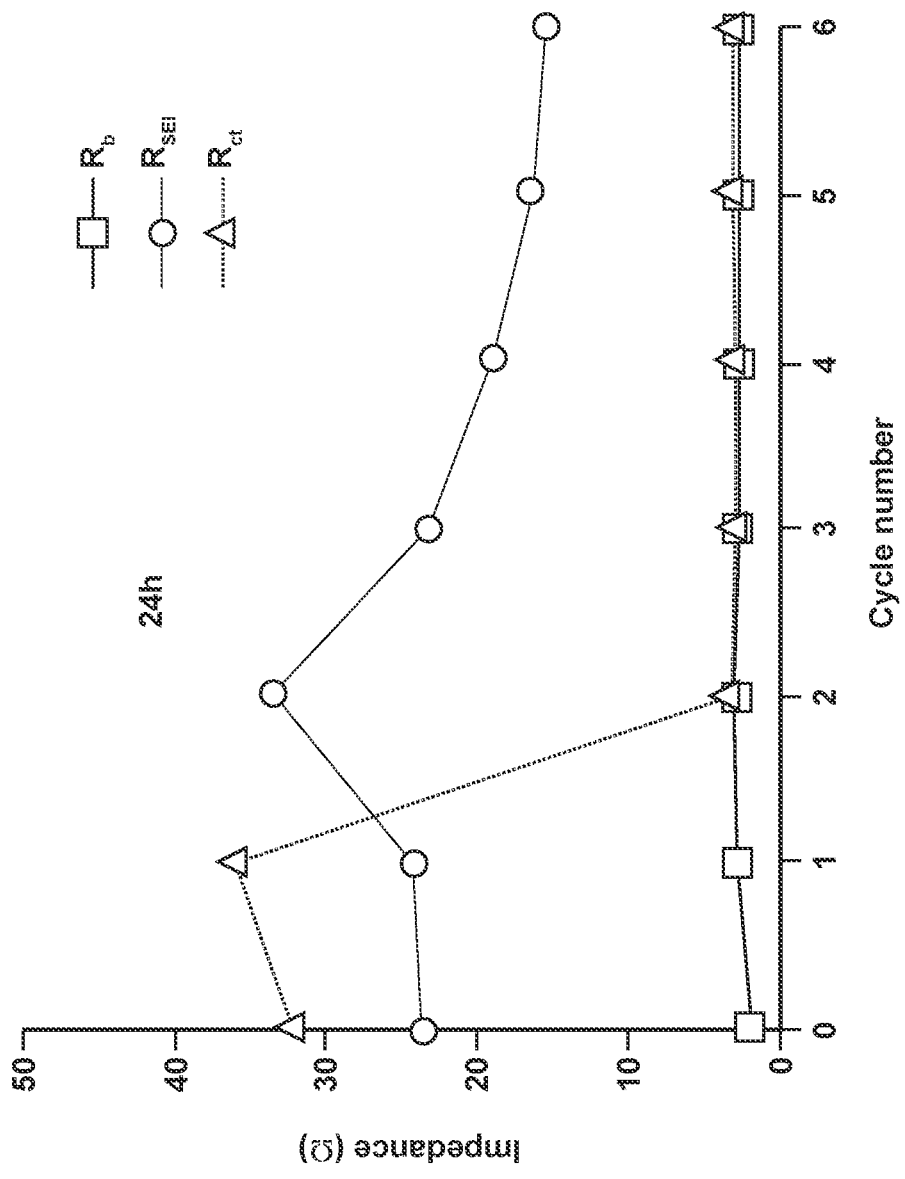
FIG. 5D is a graph of fitted EIS data of $R_b$, $R_{SEI}$, and $R_{ct}$ for the 24 h treated NMC811 sample.
Figure 5E:
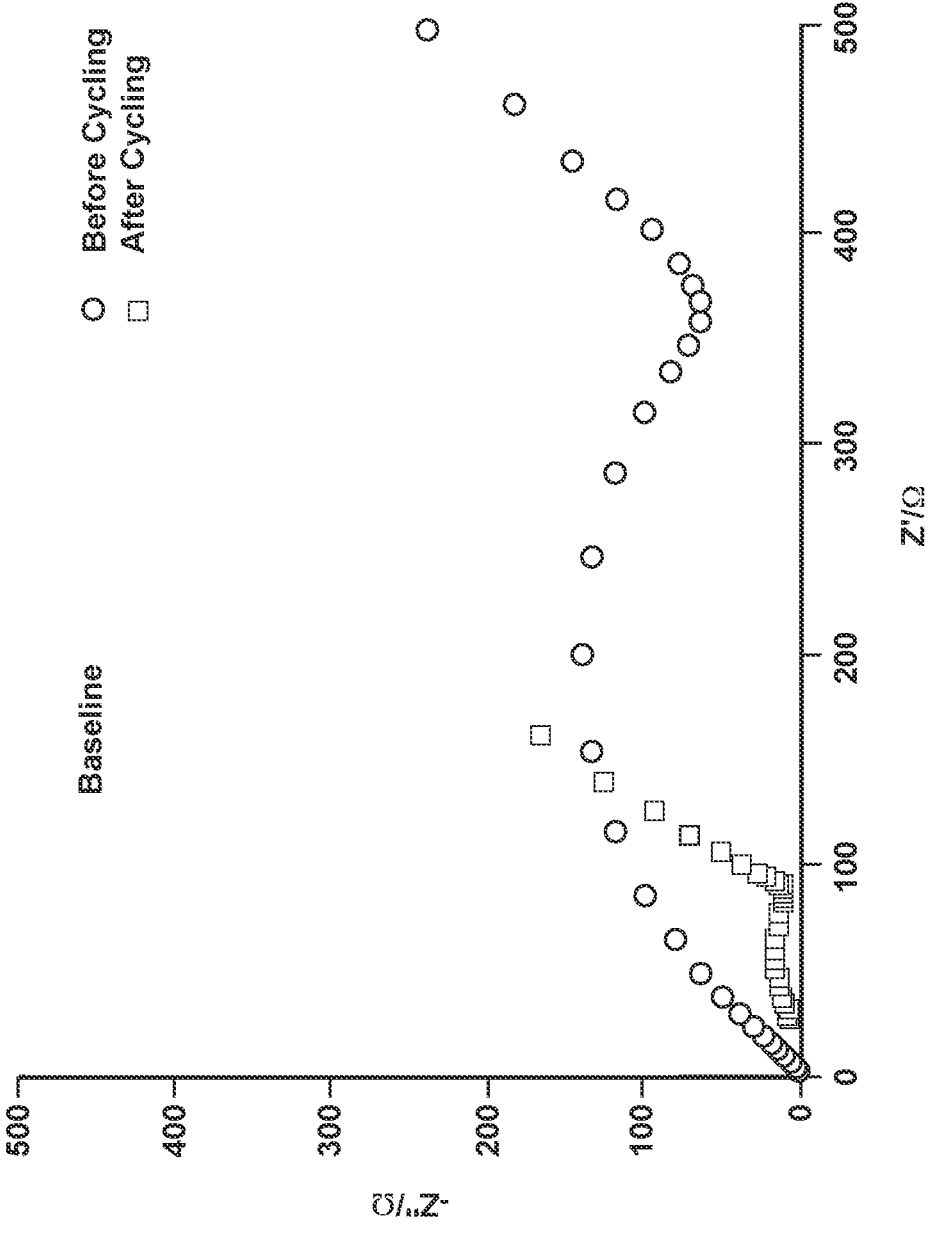
FIG. 5E is a graph of an EIS of half-cells for the pristine NMC811 sample (baseline) before and after 300 cycles.
Figure 5F:
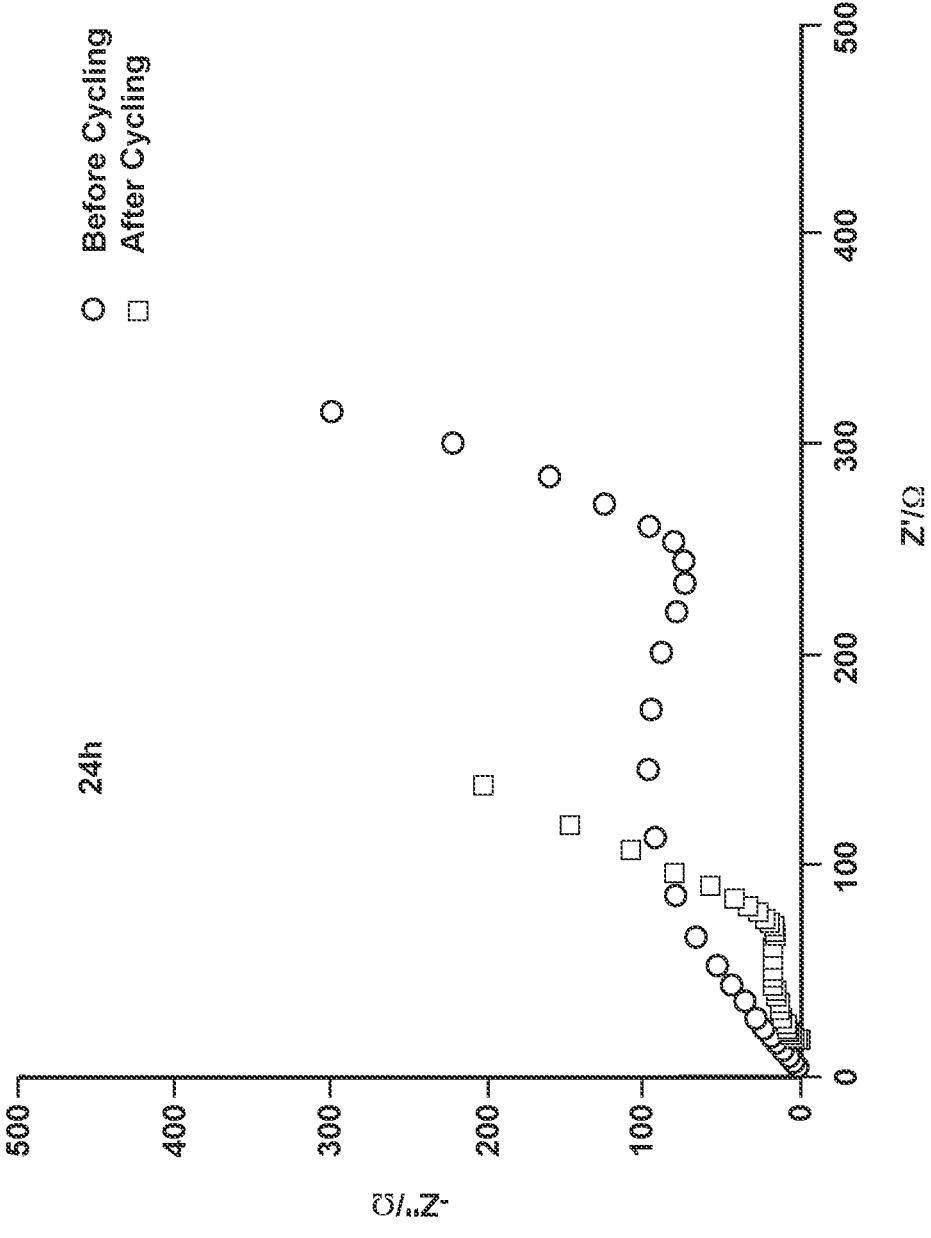
FIG. 5F is a graph of an EIS of half-cells for the 24 h treated NMC811 sample before and after 300 cycles.
Figure 5G:
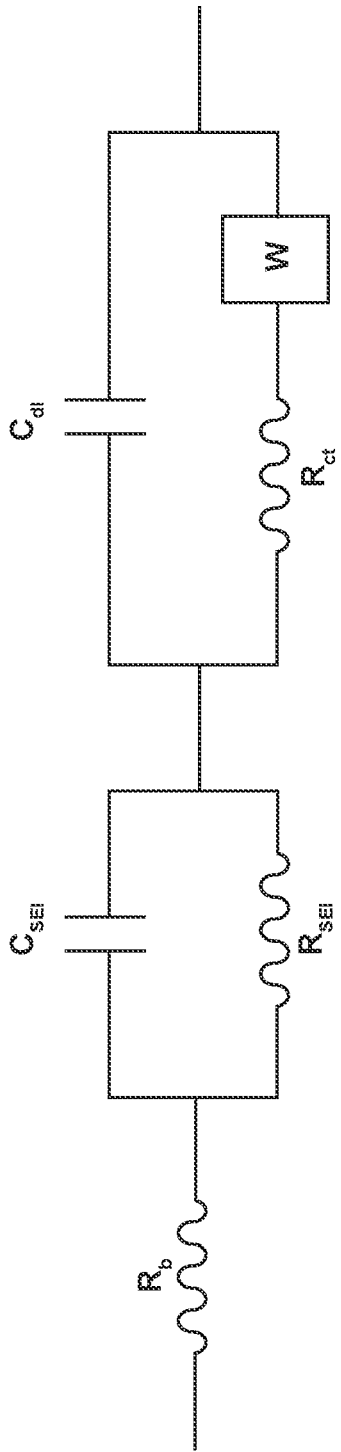
FIG. 5G is a schematic view of an equivalent circuit used to analyze the impedance spectra for the fitted EIS data shown in FIGS. 5A-F.

5A-D was the trend of $R_{SEI}$. Particularly, $R_{SEI}$ gradually decreased for the pristine sample, while for the treated samples, particularly the 24 h treated sample, $R_{SEI}$ increased initially before gradually decreasing. The difference in $R_{SEI}$ may be explained by two concurrent competing processes at the cathode, i.e., electrolyte oxidation and surface $Li_2CO_3$ reduction via reaction pathways 7-10 above. For the pristine sample, $Li_2CO_3$ reduction is so dominant, because of its thick $Li_2CO_3$ layer, that $R_{SEI}$ from $Li_2CO_3$ reduction is much bigger than the fresh SEI formation from electrolyte oxidation, resulting in overall $R_{SEI}$ decreasing with cycling. As a comparison, due to the present treatment of NMC powders in the LiFSI/DMC solution via reaction pathways 1-6 above, the surface of the NMC samples were modified, leaving more sites accessible to the electrolytes for oxidation decomposition during the initial cycles. Thus, the $R_{SEI}$ from electrolyte oxidation is bigger than that from $Li_2CO_3$ reduction, resulting in an initial $R_{SEI}$ increase with cycling, particularly for the 24 h sample. After the first few formation cycles, $R_{SEI}$ from electrolyte oxidation significantly decreased while the $Li_2CO_3$ reduction via reaction pathways 7-10 continued, leading to a gradual decrease of $R_{SEI}$ with cycling. The beneficial effect of surface treatment is further confirmed by the comparison of the EIS before and after cycling for the pristine and 24 h treated samples. As shown in FIGS. 5E and 5F, the total EIS of the pristine sample decreased from 366Ω before cycling to 88Ω after 300 cycles, whereas the total EIS of the 24 h treated sample decreased from 245Ω before cycling to 73Ω after 300 cycles. The results for the samples demonstrate that treatment of NMC powders in LiFSI/DMC as disclosed herein provides a suitable method to activate passivated NMC and other cathode materials for application in rechargeable LIBs.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of stabilizing an electrode material, the method comprising:
   adding an ion-conducting salt to an organic solvent to obtain a salt solution, wherein the ion-conducting salt is a metal bis(fluorosulfonyl)imide or metal (fluorosulfonyl)((trifluoromethyl)sulfonyl)imide, the metal being selected from a group consisting of Li, Na, K, Mg, Zn, Al, and Fe;
   introducing an electrode material to the salt solution to obtain a reaction mixture, wherein the electrode material is one of: i) a metal oxide wherein a metal of the metal oxide corresponds to the metal of the ion-conducting salt; ii) graphite; iii) carbon black; or iv) lithium titanate; and
   heat treating the reaction mixture at a temperature in a range of 50 to 70° C. for a period of time, wherein the electrode material is surface coated with an inorganic compound to obtain an activated electrode material.

2. The method of claim 1, wherein the organic solvent is one of dimethyl carbonate, diethyl carbonate, ethyl methyl carbonate, propylene carbonate, acetonitrile, acetone, and N-methyl pyrrolidinone.

3. The method of claim 1, wherein the period of time is at least 4 hours.

4. The method of claim 3, wherein the period of time is at least 8 hours.

5. The method of claim 4, wherein the period of time is in a range of 8 to 24 hours.

6. The method of claim 1, wherein the inorganic compound coated on the electrode material is LiF.

7. The method of claim 1, wherein the electrode material is further defined as a cathode active material.

8. The method of claim 1, wherein the electrode material is further defined as an anode active material.

9. The method of claim 1, wherein the electrode material initially introduced to the salt solution is a passivated electrode material.

10. The method of claim 1, wherein the step of heat treating further includes stirring the reaction mixture.

11. The method of claim 1, wherein after the step of heat treating, the method further includes separating the reaction mixture to isolate the activated electrode material.

12. The method of claim 11, further including the step of washing the isolated activated electrode material with a solvent.

13. The method of claim 11, further including the step of drying the isolated activated electrode material.

* * * * *